United States Patent [19]

Sarangdhar et al.

[11] Patent Number: 5,581,782

[45] Date of Patent: Dec. 3, 1996

[54] COMPUTER SYSTEM WITH DISTRIBUTED BUS ARBITRATION SCHEME FOR SYMMETRIC AND PRIORITY AGENTS

[75] Inventors: Nitin V. Sarangdhar, Beaverton; Konrad K. Lai, Aloha; Gurbir Singh, Portland; Michael W. Rhodehamel; Matthew A. Fisch, both of Beaverton, all of Oreg.

[73] Assignee: Intel Corporation, Santa Clara, Calif.

[21] Appl. No.: 538,597

[22] Filed: Oct. 3, 1995

Related U.S. Application Data

[63] Continuation of Ser. No. 204,736, Mar. 1, 1994, abandoned.

[51] Int. Cl.$^6$ ............................. G06F 13/18; G06F 13/364
[52] U.S. Cl. ........................... 395/800; 395/288; 395/299; 340/825.5
[58] Field of Search ................................. 395/550, 825, 395/421.08, 297, 200.01, 307, 294, 285, 303, 299, 288, 730, 739, 185.03, 800, 775, 482; 364/DIG. 1, DIG. 2; 340/825.5

[56] References Cited

U.S. PATENT DOCUMENTS

| | | | |
|---|---|---|---|
| 4,375,639 | 3/1983 | Johnson, Jr. | 340/825.5 |
| 4,414,624 | 11/1983 | Summer, Jr. et al. | 395/650 |
| 4,747,100 | 5/1988 | Roach et al. | 370/85.5 |
| 4,760,515 | 7/1988 | Malmquist et al. | 395/325 |
| 4,785,394 | 11/1988 | Fischer | 395/325 |
| 4,807,109 | 2/1989 | Farrell et al. | 395/550 |
| 4,982,400 | 1/1991 | Ebersole | 370/85.15 |
| 4,987,529 | 1/1991 | Craft et al. | 395/325 |
| 5,016,162 | 5/1991 | Epstein et al. | 395/775 |
| 5,138,707 | 8/1992 | Haller et al. | 395/550 |
| 5,151,994 | 9/1992 | Wille et al. | 395/800 |
| 5,168,568 | 12/1992 | Thayer et al. | 395/725 |
| 5,204,669 | 4/1993 | Dorfe et al. | 340/825.52 |
| 5,230,044 | 7/1993 | Cao et al. | 395/325 |
| 5,239,630 | 8/1993 | Lary et al. | 395/325 |
| 5,297,067 | 3/1994 | Blackborow et al. | 364/708.1 |

FOREIGN PATENT DOCUMENTS

| | | |
|---|---|---|
| 0432463A2 | 11/1990 | European Pat. Off. |
| 2165726 | 10/1985 | United Kingdom . |
| 2216368 | 2/1989 | United Kingdom . |

*Primary Examiner*—Daniel H. Pan
*Attorney, Agent, or Firm*—Blakely, Sokoloff, Taylor & Zafman

[57] ABSTRACT

A system and method for providing a high performance symmetric arbitration protocol that includes support for priority agents. The bus arbitration protocol supports two classes of bus agents: symmetric agents and priority agents. The symmetric agents support fair, distributed arbitration using a round-robin algorithm. Each symmetric agent has a unique Agent ID assigned at reset. The algorithm arranges the symmetric agents in a circular order of priority. Each symmetric agent also maintains a bus ownership state of busy or idle and a Rotating ID that reflects the symmetric agent with the lowest priority in the next arbitration event. On an arbitration event, the symmetric agent with the highest priority becomes the symmetric owner. However, the symmetric owner is not necessarily the overall bus owner (i.e., a priority agent may be the overall bus owner). The symmetric owner is allowed to take ownership of the bus and issue a transaction on the bus provided no other action of higher priority is preventing the use of the bus. A symmetric owner can maintain ownership without re-arbitrating if the transaction is either a bus-locked or a burst access transaction. The priority agent(s) has higher priority than the symmetric owner. Once the priority agent arbitrates for the bus, it prevents the symmetric owner from issuing any new transactions on the bus unless the new transaction is part of an ongoing bus-locked operation.

48 Claims, 10 Drawing Sheets

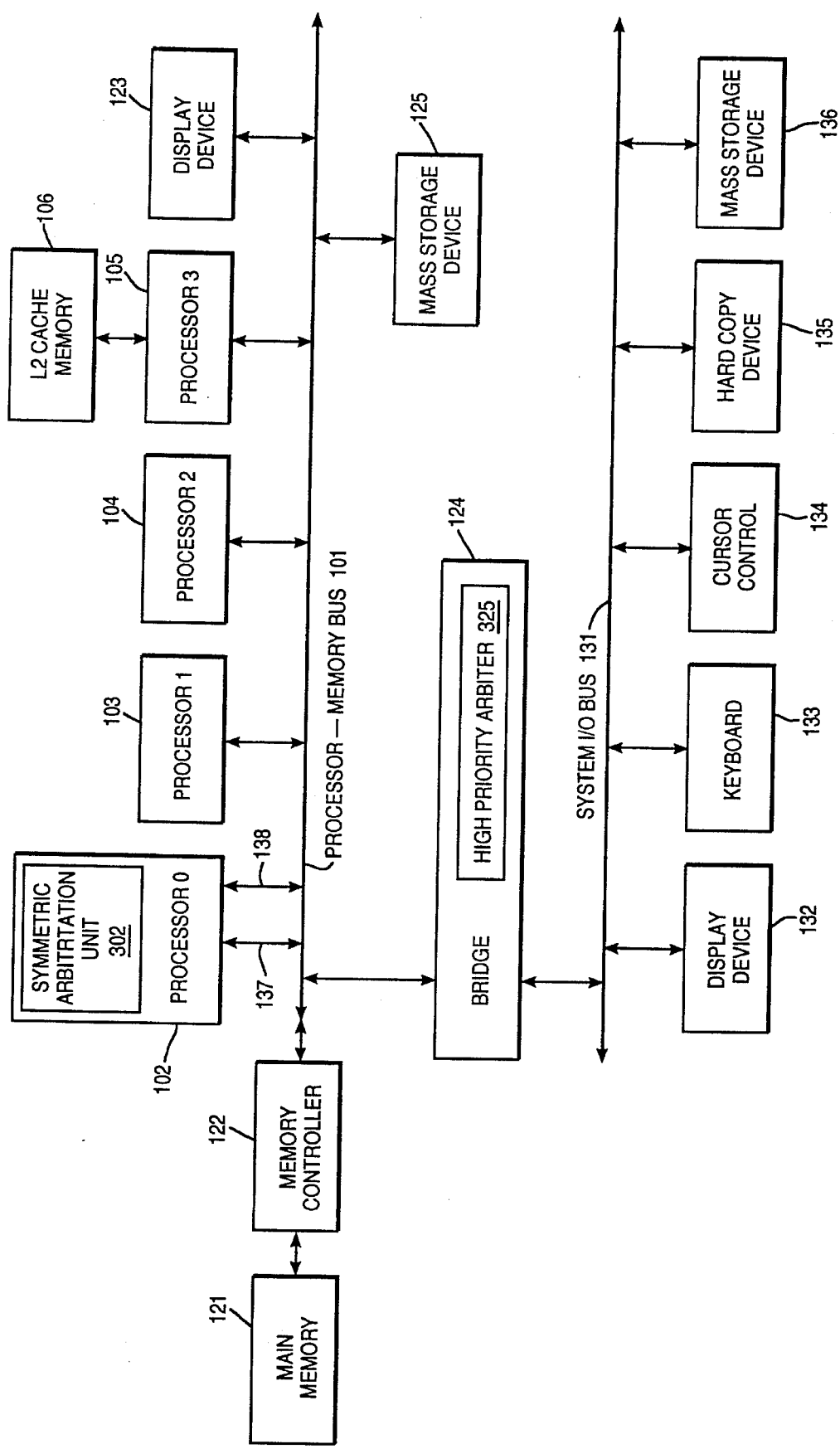
FIG_1

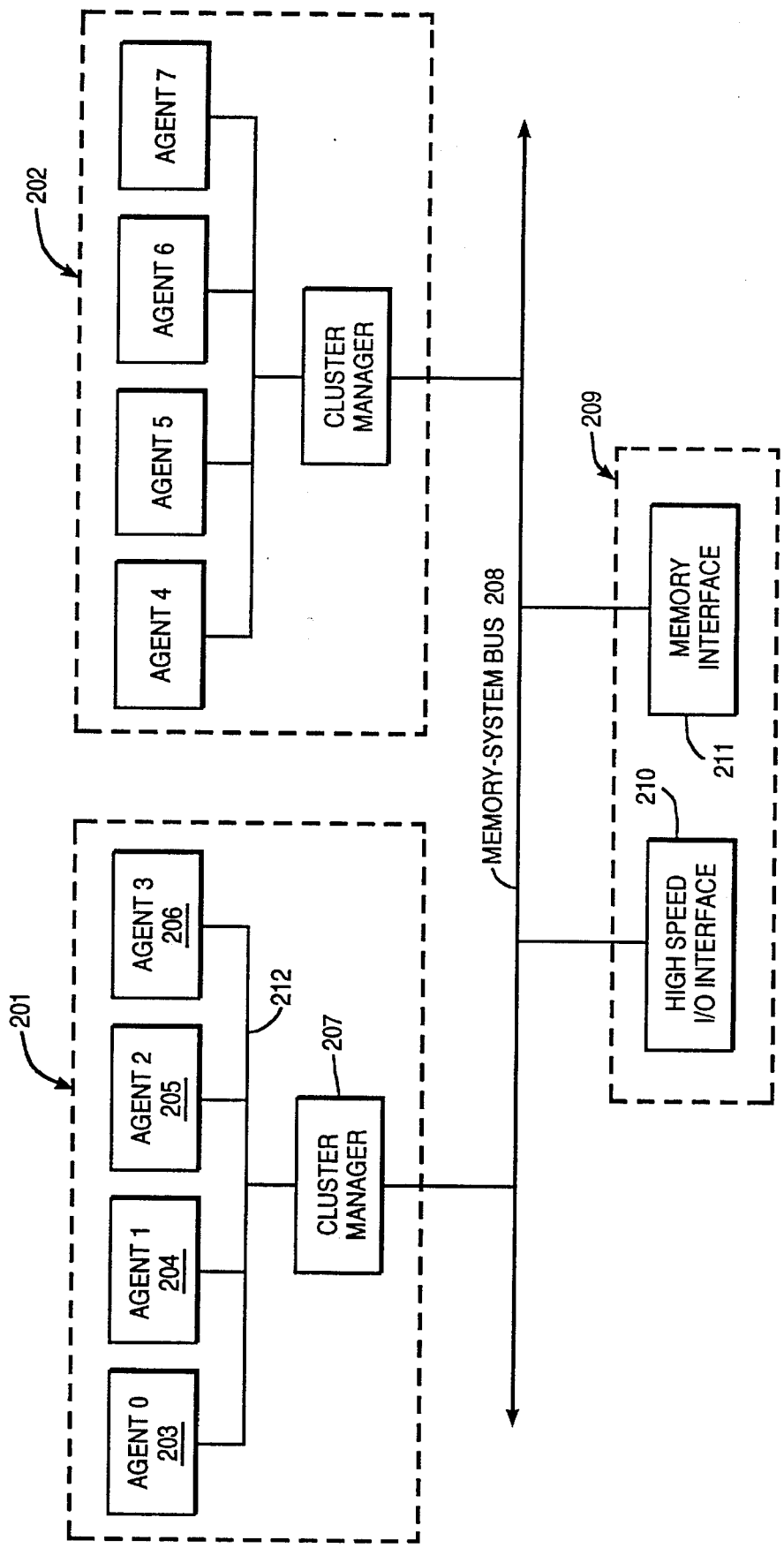
FIG_2

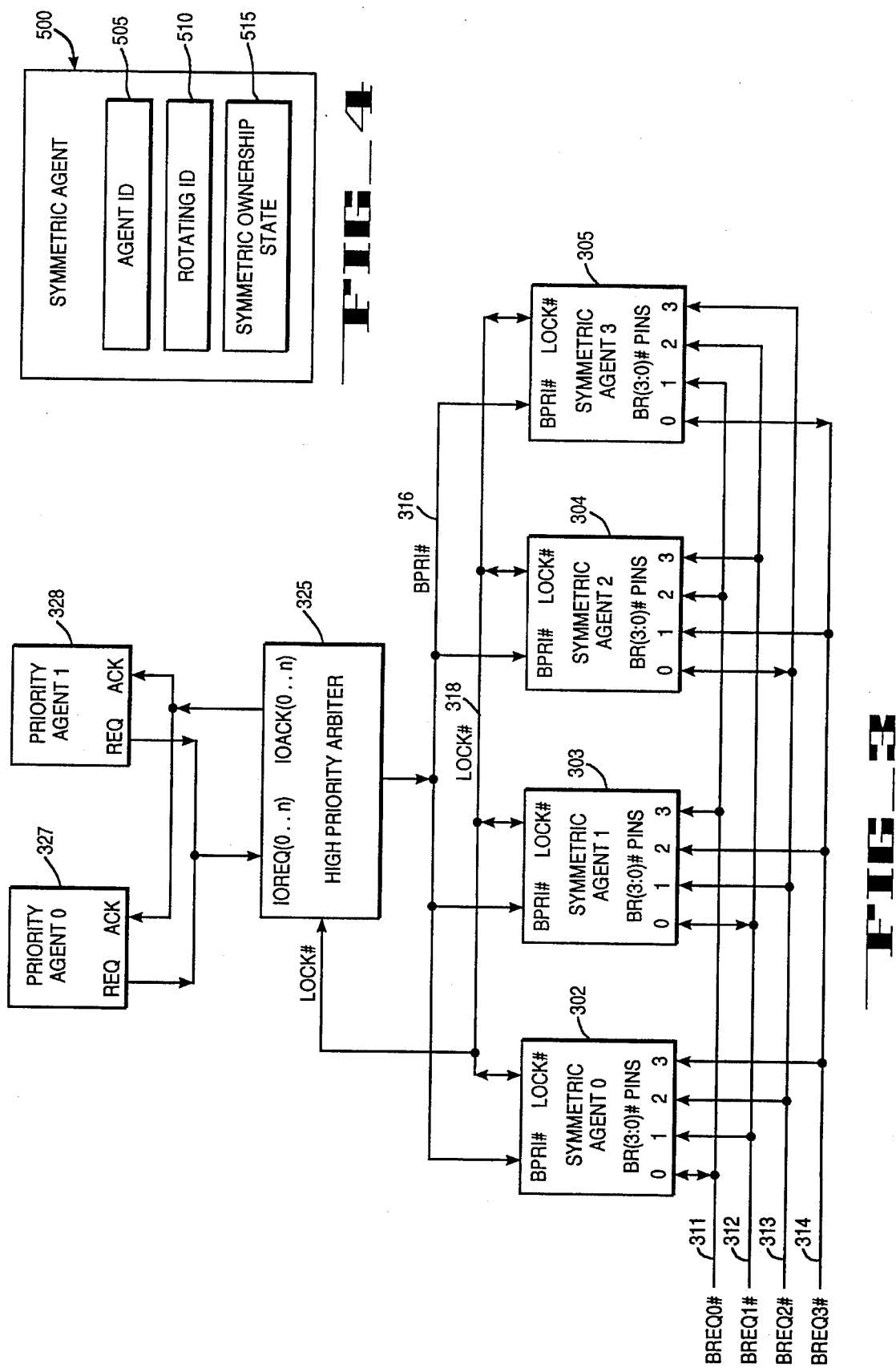

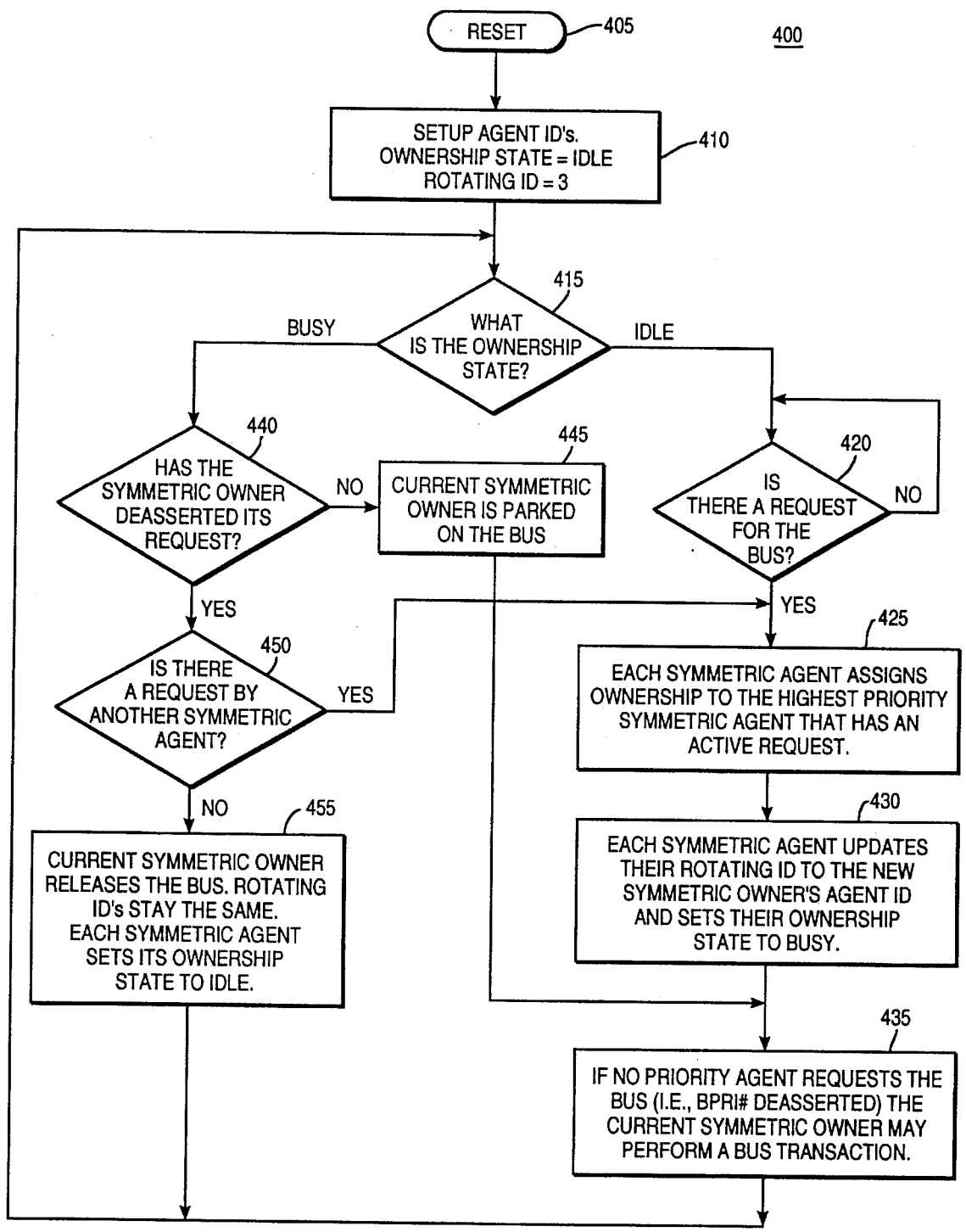
FIG_5

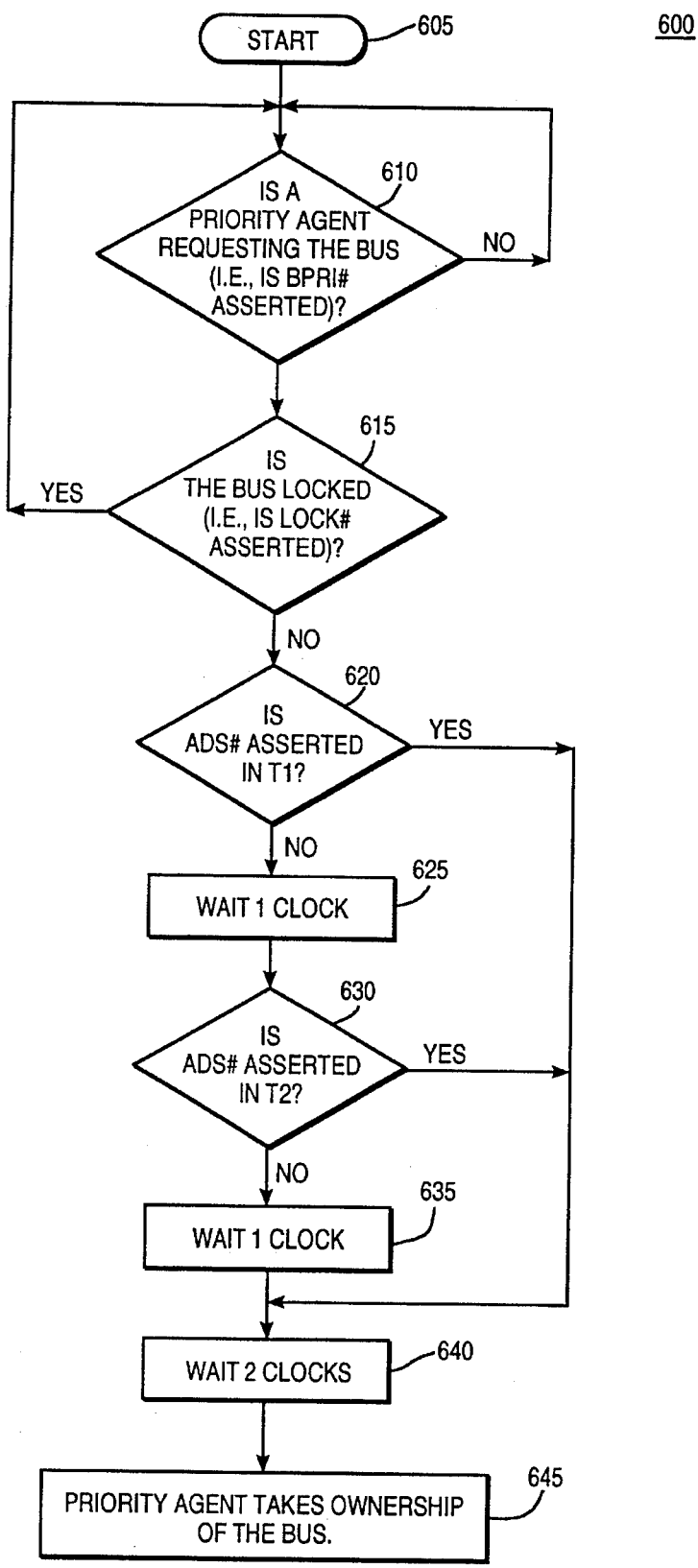
FIG_6

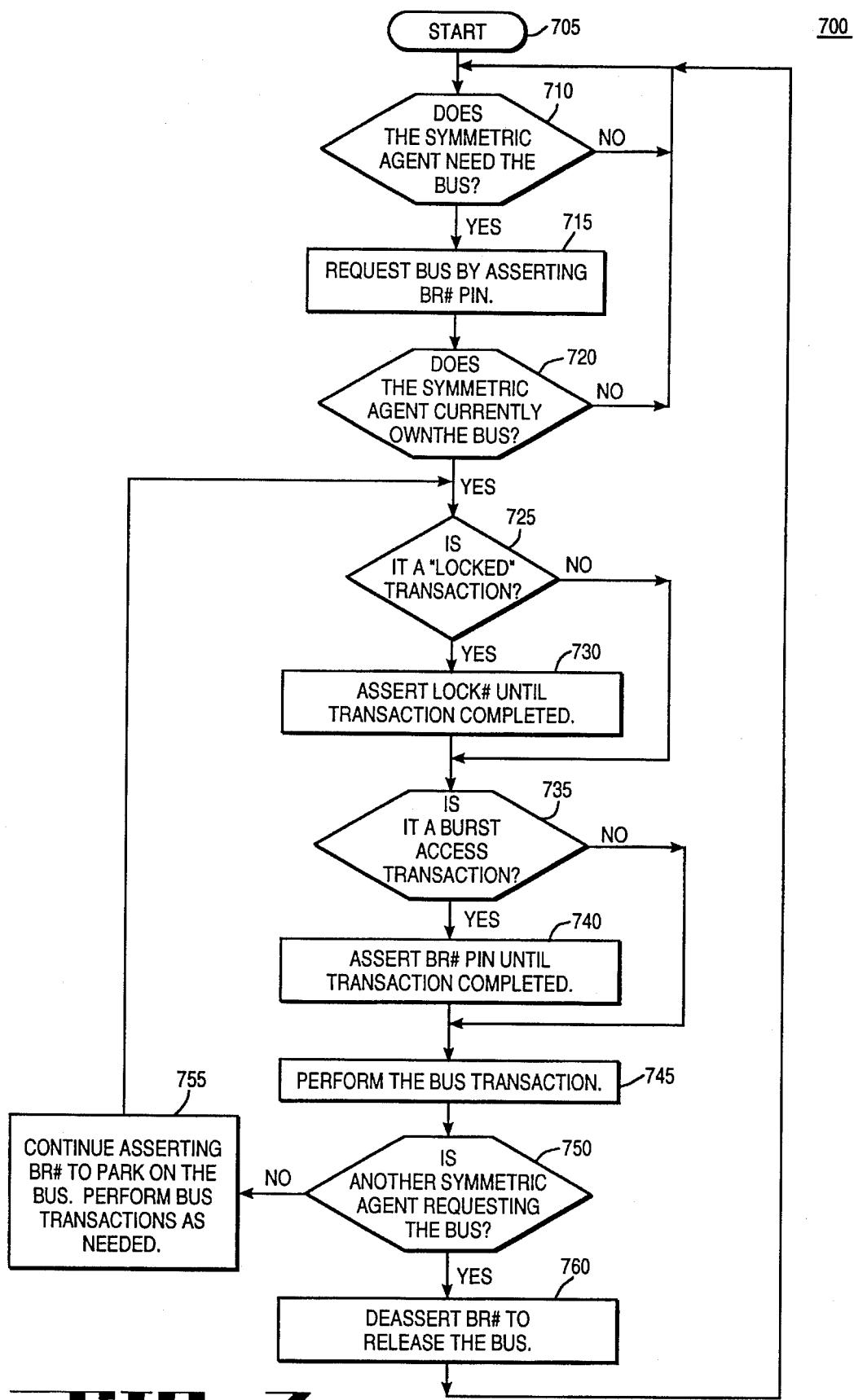
FIG_7

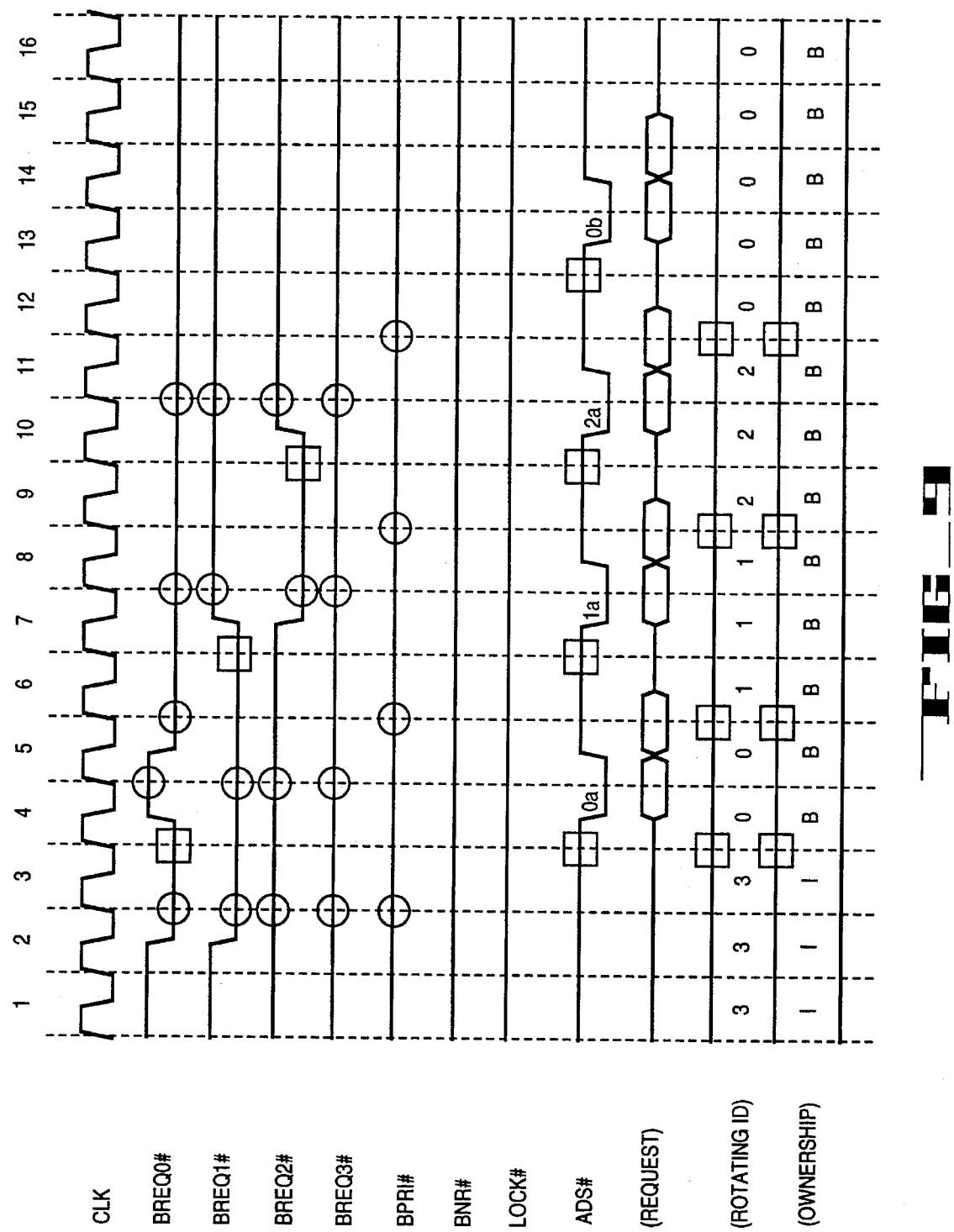
FIG_9

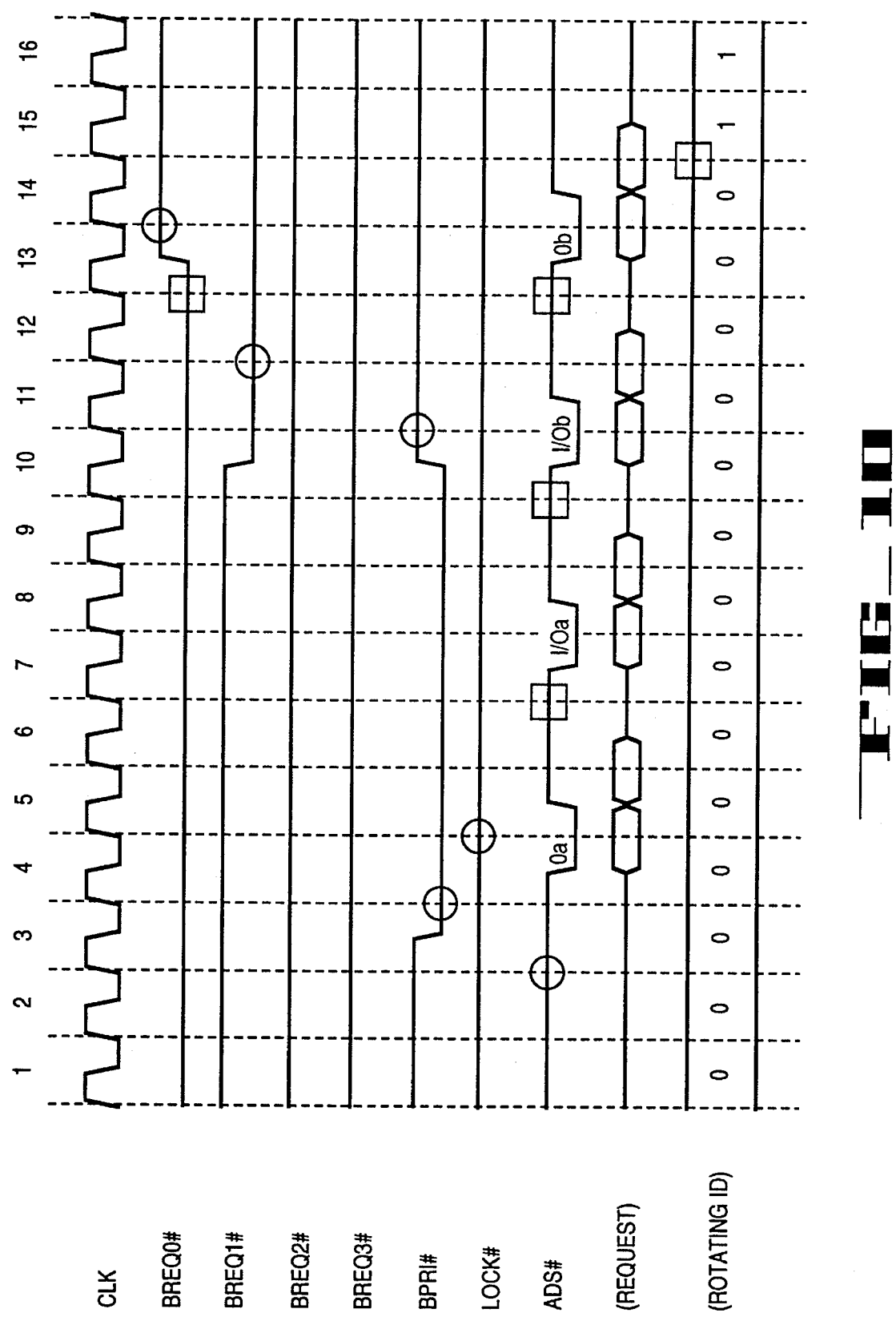
FIG_10

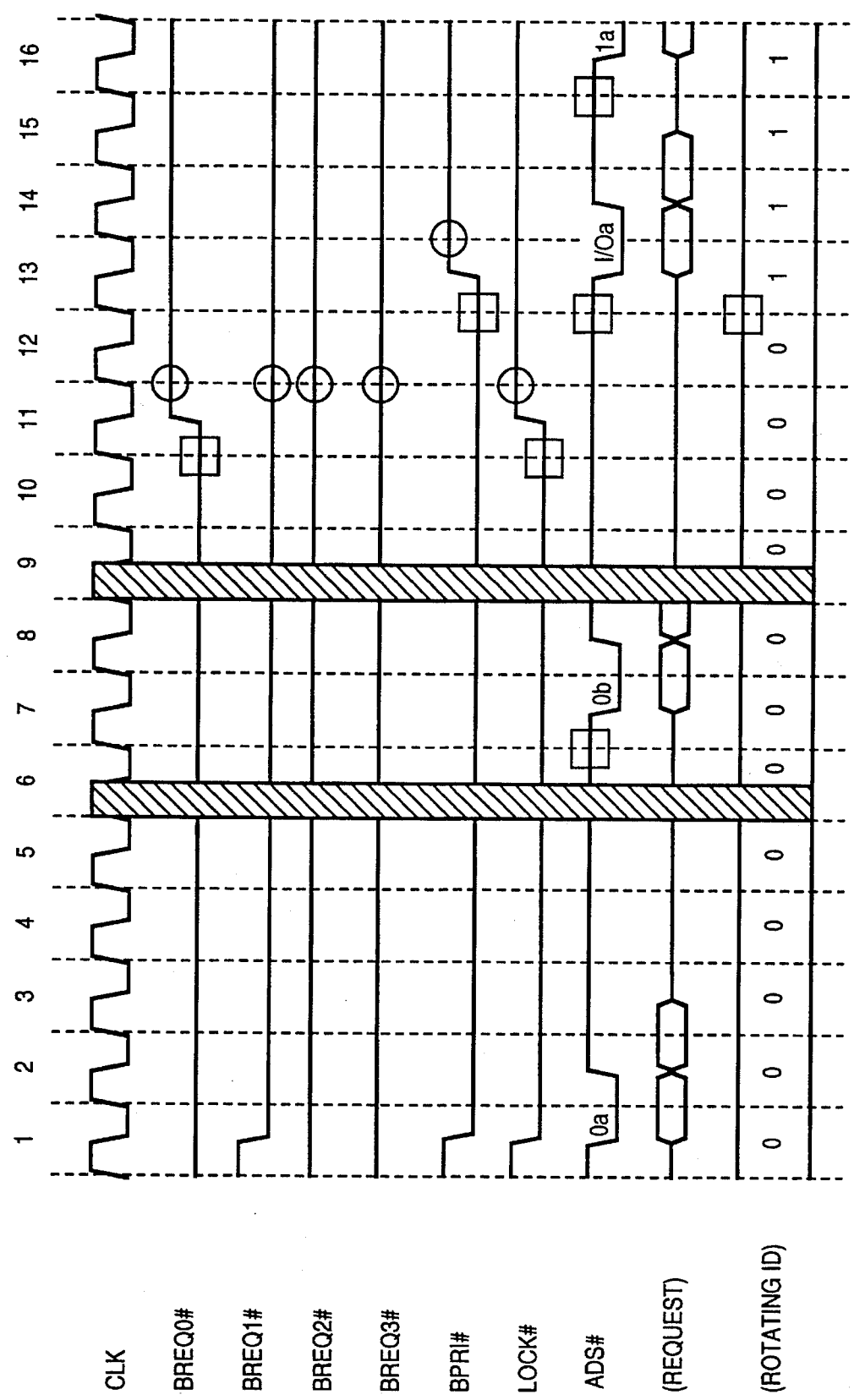
FIG_11

COMPUTER SYSTEM WITH DISTRIBUTED BUS ARBITRATION SCHEME FOR SYMMETRIC AND PRIORITY AGENTS

This is a continuation of application Ser. No. 08/204,736, filed Mar. 1, 1994, now abandoned.

RELATED APPLICATIONS

This patent application is related to patent application Ser. 08/205,035, now U.S. Pat. No. 5,515,516 entitled "Initialization Mechanism for Symmetric Arbitration Agents" which is assigned to the assignee of the present application and filed concurrently herewith.

BACKGROUND OF THE INVENTION

1. Field of the Invention

The present invention relates to the field of computer system buses. More particularly, the present invention relates to arbitration protocols for computer system buses designed for servicing multiple processors and I/O devices.

2. Related Art

In modern computer systems, multiple agents are often coupled to a bus and arbitrate for the use of the bus. An arbitration protocol determines which agent has ownership of the bus at any given time. A computer system may include multiple processors, or similar devices, that are somewhat alike in their bus usage requirements. The system may also include various I/O or similar devices. It is advantageous to meet the bus bandwidth and latency requirements of all such agents in a well designed bus arbitration protocol. The bus bandwith requirement of an agent is the percentage of time, on average, that the particular agent requires use of the bus. The latency requirement of an agent is the maximum amount of time that the agent can wait before obtaining ownership of the bus.

In one arbitration scheme a central arbiter receives requests for the use of the bus from the individual agents and selectively grants ownership of the bus. This scheme offers flexibility because computer system designers can individually determine a priority scheme among the agents by customizing the central arbiter. Two drawbacks of this approach are: 1) a costly central arbiter is required, and 2) it has a long latency of bus exchange between multiple agents.

In another arbitration scheme, the agents are daisy-chained. In this scheme arbitration priority between the various agents goes from highest to lowest priority. Two drawbacks of this scheme are inflexibility and long arbitration latency.

It would be advantageous to provide an arbitration protocol that requires no external central arbitration logic and provides low latency of bus exchange between multiple agents. The present invention provides such an advantageous result.

It is common in computer systems to couple various types of agents to a computer system bus. For example, multiple processors along with I/O devices such as mass storage devices and memory devices are often coupled to the computer system bus. These agents have varying bus bandwidth and latency requirements. A processor agent may use the bus 20% of the time while an I/O agent may use the bus far less than 1% of the time. However, compared to a processor an I/O device typically has a relatively low bus latency requirement to avoid overflow or underflow conditions imposed by their limited internal buffering. Therefore, I/O devices should obtain usage of the bus as soon as possible to meet their low latency requirement thereby avoiding system retries. An overall arbitration protocol should account for the needs of different types of bus agents. The present invention provides such an advantageous result.

Many modern computer systems can have a varying number of bus agents. The number of agents on a particular bus may vary between systems, or may vary over time for a given system. Thus, it would be advantageous to provide a versatile arbitration protocol which supports a varying number of agents with minimal additional logic and expense. The present invention provides such an advantageous result.

In summary, to overcome problems with prior art arbitration protocols it would be advantageous for an arbitration protocol: 1) to provide for varying numbers of agents on the bus without requiring additional external logic (i.e., the protocol should be "glueless"); 2) to be fair in arbitrating between agents with similar bandwidth and latency requirements, referred to as "symmetric agents"; 3) to provide a small latency bus exchange between multiple agents; 4) to accommodate burst accesses by agents; 5) to provide flexibility to meet the requirements of I/O or other such devices, referred to as "priority agents"; 6) to meet the worst case arbitration latency for I/O devices; and 7) to allow one clock cycle for signal transmission between multiple agents and a separate clock cycle for the agents to respond, referred to as a "latched bus". The present invention provides these and other advantageous results. However, the arbitration protocol of the present invention can also be used in a non "latched bus" environment.

SUMMARY OF THE INVENTION

A system and method for providing a high performance symmetric arbitration protocol that includes support for priority agents is described. Each symmetric agent in the system maintains three items in order to provide distributed arbitration using a round-robin (i.e., circular priority) algorithm: 1) a unique Agent ID initialized during reset, 2) a Rotating ID value that reflects the symmetric agent with the lowest priority in the next arbitration event, and 3) a symmetric Ownership State Indicator to indicate either a busy or an idle state. In one embodiment there are four symmetric agents and the circular order of priority is 0, 1, 2, 3, 0, 1, 2, etc. with the Rotating IDs indicating which symmetric agent has the lowest priority for the next arbitration event. Upon an arbitration event, the symmetric agent with the highest priority becomes the symmetric owner. A priority agent that requests the bus obtains ownership over the symmetric owner unless the symmetric owner is performing an atomic (i.e., bus-locked) transaction. In one such system where Intel Architecture processors are symmetric agents, a priority agent (such as an I/O device) requests the bus by asserting a BPRI# signal and obtains ownership of the bus unless the current symmetric owner is asserting a LOCK# signal.

In addition, the present invention performs a method for arbitrating between symmetric agents and a priority agent for ownership of a bus.

Elements of the present invention computer system include: a system bus; a memory coupled to the system bus; a request bus coupled to the system bus; and a plurality of processors each coupled to the system bus and the request bus for requesting ownership of the system bus and performing transactions on the system bus when selected to be a bus owner. Each processor includes an agent identifier that uniquely identifies the processor's position in a circular ordering of the processors, a rotating identifier that indicates a lowest priority processor such that a circular order of priority of the processors is defined, a request detector that detects bus ownership requests by the processors, and a symmetric arbitrator that selects a highest priority from among processors requesting the system bus to be the bus owner. The rotating identifier updates itself to indicate the bus owner as the lowest priority agent. Another element that may be included is an ownership state indicator that indicates the ownership state of the system bus. If the ownership state is a first state the symmetric arbitrator of each processor selects the bus owner at least one clock cycle earlier than if the ownership state is a second state. The first and second states can be idle and busy states, respectively.

BRIEF DESCRIPTION OF THE DRAWINGS

The present invention is illustrated by way of example and not limitation in the figures of the accompanying drawings, in which like references indicate similar elements and in which:

FIG. 1 is a block diagram of a multiprocessor computer system of the present invention;

FIG. 2 is a block diagram of a bus cluster system of the present invention;

FIG. 3 is a block diagram of a present invention system interconnection between symmetric agents and priority agents;

FIG. 4 is an illustration of the internal state tracking mechanism for distributed arbitration among symmetric agents;

FIG. 5 is a flowchart describing the steps of the present invention for arbitrating between symmetric agents;

FIG. 6 is a flowchart describing the steps of the present invention for a priority agent to a arbitrate for the bus;

FIG. 7 is a flowchart describing the steps of the present invention for a symmetric agent to request ownership of the bus;

FIG. 9 is waveforms illustrating arbitration between two or more symmetric agents while LOCK# and BPRI# stay inactive in a mode of the invention which includes Intel Architecture CPUs;

FIG. 10 is waveforms illustrating bus exchange between a priority agent and two symmetric agents in a mode of the invention which includes Intel Architecture CPUs; and FIG. 11 is waveforms illustrating an ownership request made by both a symmetric and a priority agent during an ongoing indivisible sequence by a symmetric owner in a mode of the invention which includes Intel Architecture CPUs.

DETAILED DESCRIPTION OF THE PREFERRED EMBODIMENT

Figure 8:
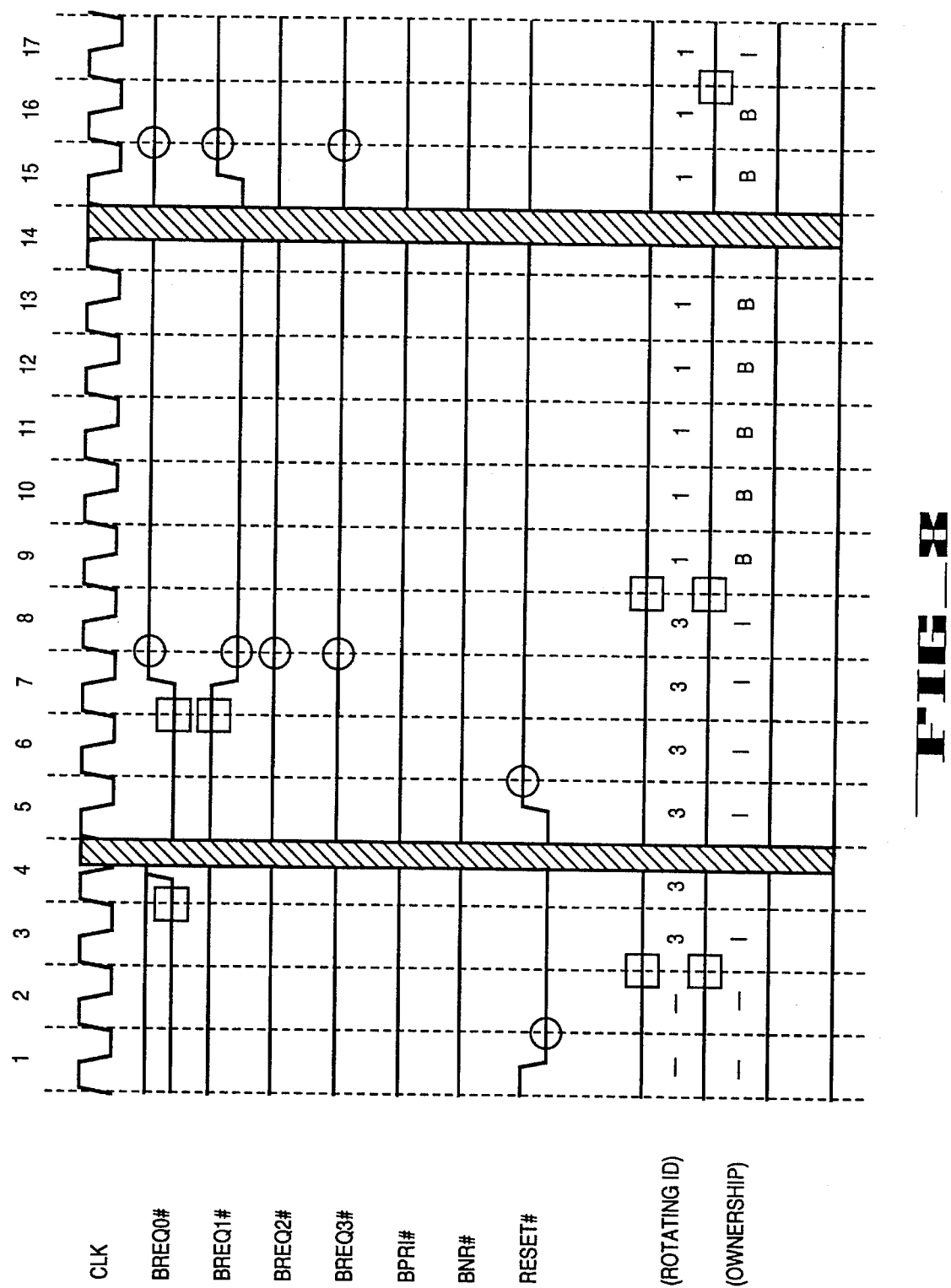
FIG. 8 is waveforms illustrating bus arbitration initiated after a reset sequence in a mode of the invention which includes Intel Architecture CPUs.

A system and method for providing a high performance symmetric arbitration protocol that includes support for priority agents is described. In the following description, numerous specific details are set forth, such as agent types, bus bandwidths, signal names, etc., in order to provide a thorough understanding of the present invention. It will be understood by one skilled in the art that the present invention may be practiced without these specific details. In other instances, well-known methods, procedures, components, and circuits have not been described in detail in order not to obscure the invention.

FIG. 1 shows an overview of an example multiprocessor computer system of the present invention. The computer system generally comprises a processor-memory bus or other communication means 101 for communicating information between one or more processors 102, 103, 104 and 105. Processor-memory bus 101 includes address, data and control buses. Processors 102 through 105 may include a small, extremely fast internal cache memory, commonly referred to as a level one (L1) cache memory for temporarily storing data and instructions on-chip. In addition, a bigger, slower level two (L2) cache memory 106 can be coupled to a processor, such as processor 105, for temporarily storing data and instructions for use by processor 105. In one mode, the present invention may include Intel® architecture microprocessors as processors 102 through 105; however, the present invention may utilize any type of microprocessor architecture, or any of a host of digital signal processors.

Processor 102, 103, or 104 may comprise a parallel processor, such as a processor similar to or the same as processor 105. Alternatively, processor 102, 103, or 104 may comprise a co-processor, such as a digital signal processor. In addition, processors 102 through 105 may include processors of different types.

Processor 102 is coupled to processor-memory bus 101 over request bus 137 and bus 138. Processor 102 also contains a symmetric arbitration unit 302 which controls both when processor 102 requests access to processor-memory bus 101 and when processor 102 is given ownership of bus 101. Request bus 137 transfers the signals associated with bus arbitration between processor 102 and the remaining agents coupled to processor-memory bus 101. The remaining signals transferred between processor 102 and processor-memory bus 101 are transferred over bus 138. These remaining signals include data signals, address signals, and additional control signals. In one embodiment, request bus 137 and bus 138 are part of processor-memory bus 101.

The other processors 103 through 105 also include a symmetric arbitration unit 302 and are coupled to processor-memory bus 101 with a request bus 137 and bus 138 as shown with regard to processor 102. In one embodiment, only the symmetric agents coupled to processor-memory bus 101 include a symmetric arbitration unit 302. In an alternate embodiment, all agents coupled to processor-memory bus 101 include a symmetric arbitration unit 302.

The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to processor-memory bus 101.

An input/output (I/O) bridge 124 may be coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101. Bridge 124 includes a high priority arbiter unit 325 that arbitrates for ownership of the processor-memory bus 101 on behalf of I/O devices such as 132–136.

I/O bus 131 communicates information between peripheral devices in the computer system. Devices that may be coupled to system I/O bus 131 include a display device 132, such as a cathode ray tube, liquid crystal display, etc., an alphanumeric input device 133 including alphanumeric and other keys, etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system I/O bus 131.

In some implementations, it may not be required to provide a display device for displaying information. Certain implementations of the present invention may include additional processors or other components. Additionally, certain implementations of the present invention may not require nor include all of the above components. For example, processors 102 through 104, display device 123, or mass storage device 125 may not be coupled to processor-memory bus 101. Furthermore, the peripheral devices shown coupled to system I/O bus 131 may be coupled to processor-memory bus 101; in addition, in some implementations only a single bus may exist with the processors 102 through 105, memory controller 122, and peripheral devices 132 through 136 coupled to the single bus.

FIG. 2 is a block diagram showing an exemplary bus cluster system of the present invention. The present invention can apply to multiprocessor computer systems having one or more clusters of processors. FIG. 2 shows two such clusters 201 and 202. Each of these clusters are comprised of a number of agents. For example, cluster 201 is comprised of four agents 203–206 and a cluster manager 207, which may include another cache memory (not shown), coupled to bus 212. Agents 203–206 can include microprocessors, co-processors, digital signal processors, etc.; for example, agents 203 through 206 may be the same as processor 102 shown in FIG. 1, being coupled to bus 212 via a request bus 137 and bus 138. Cluster manager 207 and its cache are shared between these four agents 203–206. Each cluster is coupled to a memory system bus 208, which in one embodiment is processor-memory bus 101 of FIG. 1. These clusters 201–202 are coupled to various other components of the computer system through a system interface 209. The system interface 209 includes a high speed I/O interface 210 for interfacing the computer system to the outside world and a memory interface 211 which provides access to a main memory, such as a DRAM memory array (these interfaces are described in greater detail in FIG. 1 ). In one embodiment, high speed I/O interface 210 is bridge 124 of FIG. 1, and memory interface 211 is memory controller 122 of FIG. 1.

Certain implementations of the present invention may not require nor include all of the above components. For example, cluster 201 or 202 may comprise fewer than four agents. Additionally, certain implementations of the present invention may include additional processors or other components.

FIG. 3 is a block diagram of a present invention system interconnection between symmetric agents and priority agents. It should be noted that the interconnection of FIG. 3 is exemplary only; the scope of the present invention is not limited to the interconnection shown. Other numbers of agents and interconnection schemes may be utilized which are within the spirit and scope of the present invention. Furthermore, other agents besides processors and I/O devices may be arbitrating for access to the bus, such as cluster manager 207 of FIG. 2.

For bus arbitration purposes, each symmetric agent includes BR[3:0]#, BPRI#, and LOCK# pins. The BR[3:0]# pins (i.e., bus request pins) are bus request pins whereby a symmetric agent receives bus ownership requests from bus agents and sends bus ownership requests. In one mode, a symmetric agent issues a bus ownership request by asserting its BR0# pin and receives bus ownership requests on each of the BR[3:0]# pins. The BPRI# pin (i.e., priority request pin) is a priority request pin whereby a symmetric agent receives bus ownership requests from a high priority bus agent. The LOCK# pin (i.e., bus-locked transaction pin) is a bus-locked transaction pin whereby a symmetric agent signals all other bus agents that bus ownership is currently locked, i.e. bus ownership cannot change while any bus agent is asserting its LOCK# pin. In one mode, a symmetric agent asserts its LOCK# pin while performing an atomic operation (i.e., an indivisible sequence of bus transactions).

The BR[3:0]# pins of symmetric agents 302–305 are coupled to a set of BREQ[3:0]# signals 311–314 (i.e., bus request signals) whereby individual symmetric agents send and receive bus ownership requests to arbitrate for ownership of a system bus, such as processor-memory bus 101 of FIG. 1. Additional details of the system bus have not been included so as not to clutter the drawings and obscure the present invention. In a computer system where the symmetric agents are processors (or the processors have symmetric arbitration units), the BREQ# signals are part of the processor-memory bus 101 of FIG. 1 in one mode, or part of the separate request bus 137 in another mode. Alternatively, in a bus cluster system the BREQ# signals can be part of bus 212 of FIG. 2. Each symmetric agent's BPRI# pin is coupled to a BPRI# signal 316 (i.e., a high priority arbitration signal) which can be asserted by high priority bus agents to arbitrate for bus ownership. The LOCK# pins of each symmetric agent are coupled to a LOCK# signal 318 (i.e., a bus-lock signal) which can be asserted by the current symmetric owner to maintain bus ownership during a bus-locked transaction.

A high priority arbiter 325 is coupled to drive the BPRI# signal 316 to arbitrate for bus ownership on behalf of multiple priority agents. In addition, the high priority arbiter 325 receives the LOCK# signal 318 as an input to indicate when it may arbitrate for bus ownership. If none of the symmetric agents 302–305 is asserting the LOCK# signal 318 (i.e., the LOCK# signal is deasserted), the high priority arbiter 325 can assert the BPRI# signal 316 to arbitrate for ownership of the system bus. The high priority arbiter 325 includes a set of IOREQ[n:0] pins for receiving bus ownership requests from various priority agents. In addition, high priority arbiter 325 includes a set of IOACK[n:0] pins for acknowledging to priority agents that bus ownership has been granted. When a high priority request is present on any IOREQ pin, the high priority arbiter 325 prioritizes the current requests, arbitrates for bus ownership, acknowledges ownership of the bus to the priority agent having the highest priority request.

Note that the high priority arbiter 325 can be thought of as the "priority agent" with respect to the arbitration protocol of the present invention because the high priority arbiter 325 arbitrates for the bus on behalf of multiple priority agents. In the subsequent discussion of the arbitration protocol, "priority agent" can also mean such a high priority arbiter.

In one mode including the high priority arbiter, priority agents each include a REQ pin and an ACK pin. A priority agent asserts its REQ pin (i.e., a priority agent request pin) to request ownership of the system bus. A priority agent observes its ACK pin (i.e., a priority agent acknowledge pin) to determine when it has been granted ownership of the system bus.

In one embodiment, priority agents 327 and 328 are coupled to the high priority arbiter 325. Each priority agent's REQ output is coupled to one of the high priority arbiter's IOREQ[0. . . n] inputs. Each priority agent's ACK input is coupled to one of the high priority arbiter's IOACK[0 . . . n] outputs. The priority agents 327–328 obtain ownership of the processor-memory bus 101 through a request and acknowledge protocol with the high priority arbiter 325. A priority agent sends a request for ownership of the bus by asserting its REQ output. The high priority arbiter 325 prioritizes the current requests received on its IOREQ[0 . . . n] inputs, asserts the BPRI# signal 316 to arbitrate for the bus, and notifies the selected priority agent when bus ownership is granted by asserting the appropriate IOACK[0 . . . n] output.

The symmetric agents 0–3 may be processors 0–3 of FIG. 1 with the BREQ[3:0]# signals being part of the processor-memory bus 101 in one mode or part of the request bus 137 in another mode. Priority agents 0 and 1 may be I/O devices with their REQ and ACK signals being part of system-I/O bus 131. The high priority arbiter 325 may be embodied in the bridge 124.

Thus, present invention system interconnection scheme of FIG. 3 provides a means whereby the symmetric agents 302–305 can arbitrate between themselves for ownership of the bus, i.e. a symmetric agent arbitration protocol, and also provides a means whereby priority agents 327–328 can arbitrate for ownership of the bus, i.e. a priority agent arbitration protocol.

I. The Arbitration Protocol of the Present Invention

For further clarity, the present invention arbitration protocol embodying both the symmetric agent and priority agent arbitration protocols is now discussed in more detail. The following discussion is for an arbitration protocol for up to four symmetric agents and a priority agent (or high priority arbiter that may arbitrate on behalf of any number of other priority agents). The present invention, however, is not limited to the case of four symmetric agents. Other numbers of symmetric agents are within the scope and spirit of the present invention. Note that the "priority agent" in the following discussion can also be a high priority arbiter as shown in FIG. 3. In the arbitration protocol of the present invention, a single priority agent or a high priority arbiter that arbitrates on behalf of multiple priority agents arbitrate for the bus in essentially the same manner.

Arbitration Phase. A bus agent needs to have bus ownership before it can initiate a bus transaction. If the agent is not the bus owner, it enters the Arbitration Phase to obtain bus ownership. Once bus ownership is obtained, the agent can enter the Request Phase and issue a transaction on the bus.

Arbitration Protocol Overview. The bus arbitration protocol of the present invention supports two classes of bus agents: symmetric agents and priority agents. The symmetric agents support fair, distributed arbitration using a round-robin (i.e., circular priority) algorithm. Each symmetric agent has a unique Agent ID between zero to three assigned at reset. The algorithm arranges the four symmetric agents in a circular order of priority: 0, 1, 2, 3, 0, 1, 2, etc. Other numerical schemes could be used, however. Each symmetric agent also maintains a common Rotating ID that reflects the symmetric Agent D with the lowest priority in the next arbitration event. An arbitration event is the process by which a new symmetric bus owner is determined and changed. On every arbitration event, the symmetric agent with the highest priority becomes the symmetric owner. Note that the symmetric owner is not necessarily the overall bus owner (i.e. a priority agent may be the overall bus owner). The symmetric owner is allowed to enter the Request Phase provided no other action of higher priority is preventing the use of the bus.

The priority agent(s) has higher priority than the symmetric owner. Once the priority agent arbitrates for the bus, it prevents the symmetric owner from entering into a new Request Phase unless the new transaction is part of an ongoing bus locked operation. Bus locked operations are those operations, (for example an atomic operation such as read-modify-write) which cannot be interrupted without disturbing the integrity of the operation. The priority agent is allowed to enter the Request Phase provided no other action of higher priority is preventing the use of the bus.

In one embodiment, the symmetric agents are processors and the "priority agent" is a high priority arbiter that arbitrates on behalf of multiple I/O devices.

Besides the two classes of arbitration agents, a bus lock can act as an arbitration modifier. A bus agent causes a bus lock action by asserting LOCK#. The bus lock action is available to the current symmetric owner to block other agents, including the priority agent, from acquiring the bus. Typically a bus locked operation consists of two or more transactions issued on the bus as an indivisible sequence (i.e., an atomic operation). Once the symmetric bus owner has successfully initiated the first bus locked transaction it continues to issue remaining requests that are part of the same indivisible operation without releasing the bus, i.e. it asserts its BR# and LOCK# pins low throughout the operation.

In summary, the priority for entering the Request Transfer Phase is:

1. The current bus owner retains ownership until it completes an ongoing indivisible bus locked operation.
2. The priority agent gains bus ownership over a symmetric owner.
3. Otherwise, the current symmetric owner as determined by the rotating priority is allowed to generate new transactions.

Bus Signals. The bus arbitration signals are BREQ[3:0]#, BPRI#, and LOCK#. Referring again to FIG. 3, the BREQ [3:0]# bus signals are connected to the four symmetric agents in a rotating manner. This arrangement initializes every symmetric agent with a unique Agent ID during power-on configuration. Details of the Agent ID initialization mechanism are described in the above-referenced patent application. Every symmetric agent has one input/output pin, BR0#, to arbitrate for the bus during normal operation. The remaining three pins, BR1#, BR2#, and BR3#, are input only and are used to observe the arbitration requests of the remaining three symmetric agents.

The BPRI# signal 316 is an output from the priority agent by which the priority agent arbitrates for ownership of the bus. In addition, BPRI# is an input to signal the symmetric agents that a priority agent requests ownership of the bus. LOCK# is a bi-directional signal bused among all agents. The current bus owner uses LOCK# to define an indivisible bus locked operation.

Internal Bus States of Symmetric Agents. In order to maintain a "glueless" multi-agent interface among the symmetric agents, some bus states are distributed and tracked by all symmetric agents on the bus. This is known as a distributed symmetric arbitration protocol. "Glueless" means that no external logic is required to perform symmetric arbitration.

Referring now to FIG. 4, an illustration of the internal state tracking mechanism for distributed arbitration among symmetric agents is shown. For the internal state tracking, each symmetric agent 500 maintains a two-bit Agent ID 505 and a two-bit Rotating D 510 to perform distributed round-robin arbitration. In addition, each symmetric agent 500 also maintains a symmetric ownership state bit that describes whether the bus ownership is being retained by the current symmetric owner ("busy" state) or is in a state where no symmetric agent currently owns the bus ("idle" state). The notion of idle state enables a smaller, two-clock arbitration latency from bus request to bus ownership in some cases as will be described below. The notion of busy state enables "bus parking" but increases arbitration latency to a minimum of four clocks due to a handshake with the current symmetric owner. "Bus parking" means that the current bus owner maintains bus ownership even if it currently does not have a pending transaction. If a transaction becomes pending before that bus owner relinquishes bus ownership, the current symmetric owner can drive the transaction without having to first arbitrate for the bus. The state tracking mechanism can be implemented as a state machine using combinational logic.

Agent ID. A symmetric agent's Agent ID is determined at reset, as described in the above-referenced application. The Agent ID is unique for every symmetric agent.

Rotating ID. The Rotating ID points to the symmetric agent that will be the lowest priority agent in the next arbitration event with active requests, i.e. the Agent ID of the current symmetric bus owner if the bus is busy or the Agent ID of the previous symmetric bus owner in the case of an idle bus. In one mode all symmetric agents maintain the same Rotating ID and the Rotating ID is initialized to 3 at reset. In another mode, each symmetric agent has a different value for its Rotating ID at any given time. However each symmetric agent's Rotating ID points to the same symmetric owner. After an arbitration event, the Rotating ID is assigned the Agent ID of the new symmetric owner so that the new owner becomes the lowest priority agent on the next arbitration event.

Symmetric Ownership State. The symmetric ownership state is reset to idle on an arbitration reset. The state becomes busy when any symmetric agent completes the Arbitration Phase and becomes symmetric owner. The state remains busy while the current symmetric owner retains bus ownership or transfers it to a different symmetric agent on the next arbitration event. When the state is busy, the Rotating ID is the same as the current symmetric owner Agent ID. When the state is idle, the Rotating ID is the same as the previous symmetric owner Agent ID. Note that the symmetric ownership state refers only to the symmetric bus owner. The priority agent can have actual physical ownership of the request bus, even when the state is busy and there is a current symmetric owner.

II. Present Invention Arbitration Protocol Rules

The arbitration protocol of the present invention can be expressed in the following sets of arbitration protocol rules.

In the following discussion BINIT# is a signal that indicates a catastrophic bus protocol error. AERR# is a signal that indicates a parity error in the address of an issued bus transaction. AERR# triggers a retry of the transaction having the error.

Symmetric Agent Arbitration Protocol Rules

Reset Conditions. On observation of active RESET# or BINIT#, all BREQ[3:0]# signals should be deasserted in one or two clocks. On observation of active AERR# (with AERR# observation enabled), all BREQ[3:0]# signals should be deasserted in the next clock. All agents also re-initialize their Rotating D to three and their ownership state to idle. Based on this situation, the new arbitration priority is 0, 1, 2, 3 and there is no current symmetric owner.

When a reset condition is generated by the activation of BINIT#, BREQn# should remain deasserted until 4 clocks after BINIT# is driven inactive. The first BREQ# sample point is 4 clocks after BINIT# is sampled inactive.

When the reset condition is generated by the activation of RESET#, BREQn# as driven by symmetric agents should remain deasserted until 2 clocks after RESET# is driven inactive. The first BREQ# sample point is 2 clocks after RESET# is sampled inactive. For power-on configuration, the system interface logic should assert BREQ0# for at least two clocks before the clock in which RESET# is deasserted BREQ0# should be deasserted by the system interface logic in the clock after RESET# is sampled deasserted. Agent 0 should delay BREQ0# assertion for a minimum of three clocks after the clock in which RESET# is deasserted to guarantee wired-or glitch free operation.

When a reset condition is generated by AERR#, all agents except for a symmetric owner that has issued the second or subsequent transaction of a bus-locked operation should keep BREQn# inactive for a minimum of four clocks. The bus owner n that has issued the second or subsequent transaction of bus locked operation should activate its BREQn# two clocks from inactive BREQn#. This approach ensures that the locked operation remains indivisible.

Bus Request Assertion. A symmetric agent n can activate BREQn# to arbitrate for the bus provided the reset conditions are satisfied. Once activated, BREQn# should remain active until the agent becomes the symmetric owner. Becoming the symmetric owner is a precondition to entering the Request Phase.

Ownership from Idle State. When the ownership state is idle, a new arbitration event begins with activation of at least one BREQ[3:0]#. During the next clock, all symmetric agents assign ownership to the highest priority symmetric agent with active bus request. In the following clock, all symmetric agents update their Rotating ID to the new symmetric owner Agent ID and their ownership state to busy. The new symmetric owner may enter the Request Phase as early as the clock the Rotating ID is updated.

Ownership from Busy State. When the ownership state is busy, the next arbitration event begins with the deassertion of BREQn# by the current symmetric owner. During the next clock, all symmetric agents assign ownership to the highest priority symmetric agent with active bus request. In the following clock, all symmetric agents update their Rotating ID to the new symmetric owner Agent ID and their ownership state to busy. The new symmetric owner may enter the Request Phase as early as the clock the Rotating ID is updated.

Parking and Release with a Single Bus Request. When the ownership state is busy, bus parking is an accepted mode of operation. The symmetric owner can retain ownership even if it has no pending requests, provided no other symmetric agent has an active arbitration request. The symmetric owner n may eventually deassert BREQn# to release symmetric ownership even when other requests are not active. When the symmetric owner deasserts BREQn#, all symmetric agents update their ownership state to idle, but maintain the same Rotating ID.

Bus Exchange With Multiple Bus Requests. When the ownership state is busy, on observing at least one other BREQn# active, the current symmetric owner n can hold the bus for back-to-back transactions by simply keeping BREQn# active. This mechanism should be used for bus-locked operations and can be used for unlocked operations to prevent other symmetric agents from gaining ownership.

A new arbitration event begins with deactivation of BREQn#. On observing release of ownership by the current symmetric owner, all agents assign bus ownership to the highest priority symmetric agent arbitrating for the bus. In the following clock, all agents update their Rotating ID to the Agent ID of the new symmetric owner and maintain their bus ownership state as busy. The prior symmetric owner n deasserts BREQn# for a minimum of one clock after ownership is granted to another symmetric agent.

Priority Agent Arbitration Protocol Rules

Reset Conditions. On observation of active RESET# or BINIT#, BPRI# should be deasserted in one or two clocks. On observation of active AERR#, BPRI# should be deasserted in the next clock.

When the reset condition is generated by the activation of BINIT#, BPRI# should remain deasserted until 4 clocks after BINIT# is driven inactive. The first BPRI# sample point is 4 clocks after BINIT# is sampled inactive.

When the reset condition is generated by AERR#, the priority agent should keep BPRI# inactive for a minimum of four clocks unless it has issued the second or subsequent transaction of a locked operation. The priority owner that has issued the second or subsequent transaction of a locked operation should activate its BPRI# two clocks from inactive BPRI#. This ensures that the locked operation remains indivisible.

Bus Request Assertion. The priority agent can activate BPRI# to seek bus ownership provided the reset conditions are satisfied. BPRI# can be deactivated at any time. On observing active BPRI#, all symmetric agents guarantee no new non-locked requests are generated.

Bus Exchange from an Unlocked Bus. If LOCK# is observed inactive in two clocks after BPRI# is driven asserted, the priority agent can take ownership of the bus four clocks after BPRI# assertion. The priority agent can further reduce its arbitration latency by observing the bus protocol and determining that no other agent could drive a request. For example, arbitration latency can be reduced by to two clocks by observing ADS# active and LOCK# inactive on the same clock BPRI# asserted or it can be reduced to three clocks by observing ADS# active and LOCK# inactive in the clock after BPRI# is driven asserted. ADS# is a signal that, when asserted, indicates a transaction on the bus by the current bus owner.

Bus Release. The priority agent can deassert BPRI# and release bus ownership in the same cycle that it generates its last request. It can keep BPRI# active even after the last request generation provided it can guarantee forward progress of the symmetric agents. When deasserted, BPRI# stays inactive for a minimum of two clocks.

Bus Lock Protocol Rules

Bus Ownership Exchange from a Locked Bus. The current symmetric owner n can retain ownership of the bus by keeping the LOCK# signal active (even if BPRI# is asserted). This mechanism is used during bus lock operations. After the lock operation is complete, the symmetric owner deasserts LOCK# and guarantees no new request generation until BPRI# is observed inactive.

On asserting BPRI#, the priority agent observes LOCK# for the next two clocks to monitor request bus activity. If the current symmetric owner is performing locked requests (LOCK# active), the priority agent should wait until LOCK# is observed inactive.

III. Operation of the Present Invention Arbitration Protocol

FIG. 5 illustrates a portion of the method of the present invention; specifically it shows how symmetric agents arbitrate for bus ownership. The process begins with a reset condition in step 405. During the reset condition, in step 410 for each symmetric agent: 1) the Agent ID is initialized to a unique value of 0, 1, 2, or 3, 2) the Rotating ID is set to point to agent 3, and 3) the Ownership state is set to idle. From this point on, the process proceeds after the symmetric agents have come out of reset. The following processing steps illustrate the distributed, round-robin arbitration protocol of the present invention. Each symmetric agent's internal state tracking mechanism performs the following steps to maintain the distributed, round-robin symmetric agent arbitration protocol of the present invention.

In step 415 each symmetric agent determines whether the ownership state is busy or idle. If the ownership state is busy the process jumps to step 440; otherwise the process proceeds to step 420.

In step 420 each symmetric agent determines whether there is a current request for ownership of the bus (i.e., whether one of the BREQn# input signals is asserted). A request for ownership of the bus is an arbitration event when the ownership state is idle. If there are no BREQn# requests the process stays in step 420 to continue checking for a request. If there is a BREQn# request the process proceeds to step 425.

In step 425 each symmetric agent assigns ownership to the highest priority symmetric agent that has an active request. The priority is determined from the Rotating ID values maintained by each symmetric agent's internal state tracking mechanism. For example, if the Rotating IDs indicate symmetric agent 3 then the highest priority symmetric agent is agent 0. If the Rotating IDs indicate symmetric agent 1 then the highest priority agent is agent 2. In the first example the current priority order is 0, 1, 2, 3. If symmetric agents 1 and 3 have active requests then each symmetric agent assigns ownership to agent 1. In the second example the current priority order is 2, 3, 0, 1. If symmetric agents 2 and 1 have active requests then each symmetric agent assigns ownership to agent 2. Thus the round-robin nature of the symmetric arbitration scheme. The process proceeds to step 430.

In step 430 Each symmetric agent's Rotating ID is updated to indicate the new symmetric owner. In one embodiment each symmetric agent has the same Rotating ID value. In another embodiment, each symmetric agent has a different value for its Rotating ID at any given time. However each symmetric agent's Rotating ID points to the same symmetric owner. This embodiment is described in detail in the above-referenced patent application which is hereby incorporated by reference. The process proceeds to step 435.

In step 435 the current symmetric owner performs a bus transaction if no priority agent has ownership of the bus (i.e., BPRI# is not asserted). The process then jumps to step 415 to prepare for the next symmetric arbitration event.

Returning to step 415 to describe a second path the process can take, if step 415 determines that the ownership state is busy then the process jumps to step 440 where each symmetric agent determines whether the current symmetric owner has deasserted its request (i.e., each symmetric agent samples its BR# input signals to determine if the BREQ# signal corresponding to the current symmetric owner is deasserted). When the ownership state is busy, an arbitration event is when the current symmetric owner deasserts its ownership request. If the current symmetric owner has not deasserted its request the process proceeds to step 445; otherwise the process jumps to step 450.

In step 445 the current symmetric owner has not deasserted its request and the current symmetric owner is parked on the bus. A symmetric owner parks on the bus either to perform a bus locked operation or when no other symmetric agent is requesting the bus. Step 445 jumps to step 435 where the current symmetric owner can initiate a transaction on the bus if BPRI# and BNR# are not asserted.

In step 450 each symmetric agent determines whether any symmetric agent is requesting ownership of the bus (i.e., whether any of the BREQn# signals are asserted). If a symmetric agent(s) is requesting ownership, the process jumps to step 425 to begin servicing the request; otherwise the process proceeds to step 455.

In step 455 the current symmetric owner releases the bus. The Rotating IDs are not change but each symmetric agents set its ownership state to idle. The process then jumps to step 415 to prepare for the next symmetric arbitration event.

FIG. 6 illustrates a portion of the method of the present invention; specifically it shows how a priority agent arbitrates for bus ownership. When a priority agent arbitrates for the bus (by asserting BPRI#), ownership will be granted unless the current bus owner is performing a bus-locked operation (i.e., LOCK# is asserted). To minimize any impact on system performance, the priority agent should be given ownership as early as possible. However, the priority agent should not begin a transaction on the bus before any current bus transactions are completed. The ADS# signal (which is driven by the current bus owner) indicates when a transaction occurs on the bus. Thus, when ADS# is asserted some agent is currently performing a bus transaction. When requesting ownership of the bus, a priority agent samples the ADS# signal to determine how many clocks the priority agent must wait before it can safely take ownership of the bus. The process 600 details the timing of when the priority agent can safely take ownership of the bus. The process starts in step 605, which may occur at any time during the operation of the arbitration protocol of the present invention (except during the reset sequence).

Step 610 determines whether a priority agent is requesting ownership of the bus (i.e., whether BPRI# is asserted). If no priority agent is requesting ownership, the process stays in step 610 to wait for a request by a priority agent. If a priority agent is requesting ownership of the bus, the process proceeds to step 615.

Step 615 determines whether the bus is locked (i.e., whether LOCK# is asserted). The bus can be locked by an agent that is performing a locked operation (atomic operation) or for other reasons. If the bus is locked (LOCK# asserted) the process returns to step 610. If the bus is not locked (LOCK# deasserted) the process proceeds to step 620.

Step 620 determines whether a transaction is observed on the bus (i.e., whether ADS# is sampled asserted) during the clock cycle in which the priority agent asserts its request (i.e., during the cycle in which BPRI# is asserted). If ADS# is sampled asserted, the process jumps to step 640 to wait two clock cycles before taking ownership of the bus in step 645. If ADS# is sampled deasserted, the process proceeds to step 625 to wait one clock before proceeding to step 630.

Step 630 determines whether ADS# is sampled asserted during the clock cycle following the assertion of BPRI#. If ADS# is sampled asserted, the process jumps to step 640 to wait two clock cycles before taking ownership of the bus in step 645. If ADS# is sampled deasserted, the process proceeds to step 635 to wait one clock before proceeding to step 640.

In step 640 the process waits two clocks before proceeding to step 645. In step 645 the priority agent takes ownership of the bus and initiates a bus transaction. The process then returns to step 610 to service the next bus ownership request by a priority agent.

FIG. 7 illustrates a portion of the method of the present invention; specifically it shows how a symmetric agent requests bus ownership. The is the process (or rules) followed by a symmetric agent in generating bus requests. The process starts in step 700. In step 705 the symmetric agent determines whether it needs ownership of the bus. If the symmetric agent needs ownership of the bus, the process proceeds to step 715; otherwise the process stays in step 710.

In step 715 the symmetric agent asserts its BR0# output pin to request ownership of the bus (i.e., the symmetric agent asserts the BREQn# signal that it drives to signal a request for bus ownership).

In step 720 the symmetric agent determines whether it has been granted ownership of the bus under the arbitration protocol. The symmetric agent knows that it has been granted ownership of the bus when the Rotating ID in its internal state tracking mechanism points to the symmetric agent. If the arbitration protocol has granted ownership of the bus to the requesting symmetric agent, the process jumps to step 725; otherwise the process jumps to step 710.

In step 725 the symmetric agent determines whether it will be performing a bus-locked transaction. If so, the process proceeds to step 730 where the symmetric agent asserts the LOCK# signal to prevent all other agents from gaining ownership of the bus until the bus-locked transaction is completed. If the transaction is not bus-locked, the process jumps to step 735.

In step 735 the symmetric agent determines whether the transaction is a burst access (bursty transaction). A burst access transaction is a number of high-speed memory accesses to sequential memory locations. If the transaction is a burst access, the process proceeds to step 740 where the symmetric agent asserts the BR0# output pin (thereby asserting its BREQn# signal) until the burst transaction is completed. Continued assertion of the BR# pin prevents another symmetric agent from gaining ownership of the bus until the burst access transaction is completed. If the transaction is not bursty, the process jumps to step 745.

In step 745 the symmetric owner performs the transaction on the bus and proceeds to step 750 when the bus transaction is completed.

In step 750 the symmetric agent determines whether another symmetric agent is requesting ownership of the bus. If another symmetric agent is requesting ownership of the bus then in step 760 the symmetric owner deasserts the BR0# output pin (thereby deasserting its BREQn# signal) to release the bus to the next symmetric owner. The process jumps from step 760 to step 710 to repeat the process.

In step 750 if another symmetric agent is not requesting ownership of the bus then in step 755 the symmetric owner continues asserting the BR# pin to park on the bus. While parked on the bus the symmetric owner can perform transactions without having to first arbitrate for the bus. The process jumps from step 755 to step 725 to service any pending transaction requests.

It is appreciated that the present invention arbitration protocol may be carried out by state machines in the bus agents. For example, each symmetric agent may have an internal state machine including the state tracking mechanism that implements the protocol. The priority agent may also include a state machine that implements the protocol. The details of the state machines are not described in order not to obscure the present invention. One of Ordinary skill in the art can easily provide suitable state machines to implement the present invention arbitration protocol given the above description and examples below.

IV. EXAMPLES

To further illustrate the present invention arbitration protocol, a number of examples are given. In the following examples, a square on a waveform indicates that either a request or a response is being driven on that signal by one of the agents. A circle on a signal indicates that the signal is being observed by the agents.

Symmetric Arbitration of a Single Agent After RESET#. Referring now to FIG. 8, waveforms illustrating bus arbitration initiated after a reset sequence are shown. BREQ[3:0]#, BPRI#, LOCK#, and BNR# should be deasserted during RESET#. (BREQ0# is asserted 2 clocks before RESET# is deasserted for initialization reasons.) Symmetric agents can begin arbitration in the clock after RESET# is sampled deasserted by driving the BREQ[3:0]# signals. Once ownership is obtained, the symmetric owner can park on the bus as long as no other symmetric agent is requesting it. The symmetric owner can voluntarily release the bus to idle.

RESET# is asserted in T1, which is observed by all agents in T2. This signal forces all agents to initialize their internal states and bus signals. In T3 or T4, all agents deassert their arbitration request signals BREQ[3:0]#, BPRI# and arbitration modifier signals BNR# and LOCK#. The symmetric agents reset their ownership state to idle and their Rotating ID to point to symmetric agent 3 (so that bus agent 0 has the highest symmetric priority after RESET# is deasserted).

In T7, the clock after RESET# is sampled inactive, symmetric agent 1 asserts BREQ 1# to arbitrate for the bus. In T8, all symmetric agents observe active BREQ 1# and inactive BREQ[0, 2, 3]#. During T8, all symmetric agents determine that symmetric agent 1 is the only symmetric agent arbitrating for the bus and therefore has the highest priority. As a result, in T9, all symmetric agents update their Rotating ID to point to symmetric agent 1, the Agent ID of the new symmetric owner and its ownership state to busy, indicating that the bus is busy.

Starting from T8, symmetric agent 1 continually monitors BREQ[0, 2, 3]# to determine if it can park on the bus. Since BREQ[0, 2, 3]# are observed inactive, symmetric agent 1 continues to maintain bus ownership by keeping BREQ I# asserted (i.e., symmetric agent 1 parks on the bus).

In T15, symmetric agent 1 voluntarily deasserts BREQ 1# to release bus ownership, which is observed by all agents in T16. In T17 all symmetric agents update their ownership state from busy to idle. This action reduces the arbitration latency of a new symmetric agent to two clocks on the next arbitration event.

Symmetric Arbitration with no LOCK#. Referring now to FIG. 9, waveforms illustrating arbitration between two or more symmetric agents while LOCK# and BPRI# stay inactive are shown. Because LOCK# and BPRI# remain inactive, bus ownership is determined based on a Rotating ID and bus ownership state. The symmetric agent that wins the bus releases it to the other agent as soon as possible. In one embodiment, symmetric agents are limited to one bus transaction, unless either the outstanding operation is locked or no other agent wants the bus). The symmetric agent may re-arbitrate one clock after releasing the bus. Also note that when a symmetric agent n issues a transaction to the bus, BREQn# should stay asserted until the clock in which ADS# is asserted.

In T1, all arbitration requests BREQ[3:0]# and BPRI# are inactive. The bus is not stalled by BNR#. The Rotating IDs point to symmetric agent 3 and the bus ownership state is idle. Hence, the round-robin arbitration priority is 0, 1, 2, 3.

In T2, symmetric agent 0 and symmetric agent 1 activate BREQ0# and BREQ 1# respectively to arbitrate for the bus. In T3, all symmetric agents observe inactive BREQ[3:2]# and active BREQ[1:0]#. Since the Rotating ID is 3, during T3, all symmetric agents determine that symmetric agent 0 has the highest priority and is the next symmetric owner. In T4, all symmetric agents update the Rotating ID to zero and the bus ownership state to busy.

Since BPRI# is observed inactive in T3 and the bus is not stalled, in T4, symmetric agent 0 can begin a new Request Phase. (If BPRI# has been asserted in T3, the arbitration event, the updating of the Rotating ID, and ownership states would not have been affected. However, symmetric agent 0 would not be able to drive a transaction in T4). In T4, symmetric agent 0 initiates request phase 0a.

In response to active BREQI# observed in T3, symmetric agent 0 deasserts BREQ0# in T4 to release bus ownership. Since symmetric agent 0 has another internal request, it immediately reasserts BREQ0# after one clock in T5.

In T5, all symmetric agents observe BREQ0# deassertion, the release of bus ownership by the current symmetric owner. During T5, all symmetric agents recognize that symmetric agent I now remains the only symmetric agent arbitrating for the bus. In T6, all symmetric agents update their Rotating ID to point to symmetric agent 1. The ownership state remains busy.

Symmetric agent 1 assumes bus ownership in T6 and generates request phase 1a in T7 (three cycles from request 0a). In response to active BREQ0# observed in T5, symmetric agent 1 deasserts BREQ1# in T7 along with the first clock of the Request Phase and releases symmetric ownership. Meanwhile, symmetric agent 2 asserts BREQ2# to arbitrate for the bus. In T8, all symmetric agents observe inactive BREQ1#, the release of ownership by the current symmetric owner. Since the Rotating ID is one, and BREQ0#, BREQ2# are active, all symmetric agents determine that symmetric agent 2 is the next symmetric owner. In T9, all symmetric agents update their Rotating ID to point to symmetric agent 2. The ownership state remains busy.

In T10, (three cycles from request 1a) symmetric agent 2 drives request 2a. In response to active BREQ0# observed in T9, symmetric agent 2 deasserts BREQ2# in T10. In T11 all symmetric agents observe inactive BREQ2# and active BREQ0#. During T11, they recognize that symmetric agent 0 is the only symmetric agent arbitrating for the bus. In T12, all symmetric agents update their Rotating ID to point to symmetric agent 0. The ownership state remains busy.

In T12, symmetric agent 0 assumes bus ownership. In T13 symmetric agent 0 initiates request 0b (three cycles from request 2a). Because no other agent has requested the bus, symmetric agent 0 parks on the bus by keeping its BREQ0# signal active.

Bus Exchange Symmetric and Priority Agents with no LOCK#. Referring now to FIG. 10, waveforms illustrating bus exchange between a priority agent and two symmetric agents are shown. A symmetric agent relinquishes physical bus ownership to a priority agent as soon as possible. A maximum of one unlocked ADS# can be generated by the current symmetric bus owner in the clock after BPRI# is asserted because BPRI# has not yet been observed. Note that the symmetric bus owner (Rotating ID) does not change due to the assertion of BPRI#. BPRI# does not affect symmetric agent arbitration, or the symmetric bus owner. Finally, note that in this example BREQ0# should remain asserted until T12 because transaction 0b has not yet been driven. An agent can not drive a transaction unless it owns the bus in the clock in which ADS# is to be driven for that transaction.

In FIG. 10, before T1 agent 0 owns the bus. The Rotating ID points to symmetric agent 0. The ownership state is busy. In T3, the priority agent asserts BPRI# to request bus ownership. In T4, symmetric agent 0, the current owner, issues its last request 0a. In T4, all symmetric agents observe BPRI# active, and guarantee no new unlocked request generation starting in T5.

In T3, the priority agent observes inactive ADS# and inactive LOCK# and determines that it may not gain request bus ownership in T5 because the current request bus owner might issue one last request in T4. In T5, the priority agent observes inactive LOCK# and determines that it owns the bus and may begin issuing requests starting in T7, four clocks from BPRI# assertion.

The priority agent issues two requests, I/Oa. and I/Ob, and continues to assert BPRI# through T10. In T10, the priority agent deasserts BPRI# to release bus ownership back to the symmetric agents. In T10, symmetric agent 1 asserts BREQ 1 # to arbitrate for the bus.

In T11, symmetric agent 0, the current symmetric owner observes inactive BPRI# and initiates request 0b in T13 (three clocks from the previous request.) In response to active BREQ1#, symmetric agent 0 deasserts BREQ0# in T13 to release symmetric ownership. In T14 all symmetric agents observe inactive BREQ0#, the release of ownership by the current symmetric owner. Since BREQ1# is the only active bus request they assign symmetric agent 1 as the next symmetric owner. In T15 all symmetric agents update their Rotating ID to point to symmetric agent 1.

Symmetric Priority Bus Exchange During LOCK#. Referring now to FIG. 11, waveforms illustrating an ownership request made by both a symmetric and a priority agent during an ongoing indivisible sequence by a symmetric owner are shown. When this is the case, LOCK# takes priority over BPRI#. That is, the symmetric bus owner does not give up the bus to the priority agent while it is driving an indivisible locked operation. Note that symmetric agent 1 can hold bus ownership even though BPRI# is asserted. Like the BREQ[3:0]# signals, if the priority agent is going to issue a transaction, BPRI# should not be driven inactive until the clock in which ADS# is driven asserted.

Before T1, symmetric agent 0 owns the bus. In T1, symmetric agent 0 initiates the first transaction in a bus locked operation by asserting LOCK# along with request 0a. Also in T1, the priority agent and symmetric agent 1 assert BPRI# and BREQ1#, respectively, to arbitrate for the bus. Symmetric agent 0 does deassert BREQ0# or LOCK# since it is in the middle of a bus locked operation.

In T7, symmetric agent 0 initiates the last transaction in the bus locked operation. At the request's successful completion the indivisible sequence is complete and symmetric agent 0 deasserts LOCK# in T11. Since BREQ1# is observed active in T10, symmetric agent 0 also deasserts BREQ0# in T11 to release symmetric ownership.

The deassertion of LOCK# is observed by the priority agent in T12 and it begins new-request generation from T13. The deassertion of BREQ0# is observed by all symmetric agents and they assign the symmetric ownership to symmetric agent 1, the symmetric agent with active bus request. In T13, all symmetric agents update their Rotating ID to point to symmetric agent 1, the Agent ID of the new symmetric owner.

Since symmetric agent 1 observed active BPRI# in T12, it guarantees no new request generation beginning T13. In T13, the priority agent deasserts BPRI#. In T15, three clocks from the previous request and at least two clocks from BPRI# deassertion symmetric agent 1, the current symmetric owner, issues request 1a.

The arbitration protocol of the present invention solves the problems of prior arbitration protocols detailed in the background of the invention.

First, the present invention provides for varying numbers of agents on the bus without additional logic or changes to existing external logic. This is possible due to the distributed nature of the symmetric agent arbitration protocol. For example, a uniprocessor computer system initially has one processor (symmetric agent). Under the arbitration protocol of the present invention, the single symmetric processor will park on the bus because no other requests from symmetric agents will occur. Adding additional processors is done by simply inserting the added processors into empty processor sockets on the computer system board. Since each processor tracks the bus states with their own internal state tracking state machine, no additional logic is required to be added to the motherboard.

Second, the present invention arbitration protocol is fair in arbitrating between symmetric agents. The round-robin nature of the protocol provides essentially an equal sharing of the bus between multiple symmetric agents.

Third, the latency of bus exchange between symmetric agents is small. In a "latched bus" environment, a symmetric agent can obtain ownership of the bus in two clocks when arbitrating from idle ownership state. From the busy ownership state, a symmetric agent obtains ownership of the bus in three or four clocks depending on whether the symmetric owner is or is not parked on the bus.

Fourth, the present invention arbitration protocol allows a symmetric agent to retain ownership of the bus for burst accesses. This maintains, in a multiprocessor environment, the performance advantage of burst accesses by individual agents.

Fifth, the present invention arbitration protocol is flexible to support the needs of I/O devices. The priority agent protocol gives a priority agent ownership of the bus within 2–4 clocks unless the current bus owner is performing bus-locked transaction. In one embodiment, the longest bus locked transaction performed by a symmetric agent is a sequence of: lock memory read, lock memory read, lock resolution, lock memory write, lock memory write. Even in this worst case, the worst case arbitration latency for I/O devices is met.

Finally, the present invention arbitration protocol supports a "latched bus" whereby signals between multiple agents are transmitted in one clock cycle and agents respond to the transmitted signals in the following clock cycle. The latched bus is advantageous in computer system because interprocessor (transmission) delays are separated from intraprocessor delays (processor delays in responding to input signals). This makes processor design more independent from board level design.

Certain advantages of the present invention have been particularly described. Other benefits and advantages of the present invention, though not particularly pointed out, are evident from the above description.

Thus the system and method for providing a high performance symmetric arbitration protocol that includes support for priority agents has been described.

What is claimed is:

1. A computer system with distributed bus arbitration, said computer system comprising:

bus means for providing a communication interface;

a plurality of stand-alone agents coupled to said bus means, said stand-alone agents including at least one priority agent and a plurality of symmetric agents;

memory means coupled to said bus means for storing instructions and data;

at least one of said symmetric agents being a processor means for executing said instructions and processing said data and for performing transactions on said bus means, each of said symmetric agents having symmetric arbitration means for arbitrating ownership of said bus means, wherein each said symmetric arbitration means generates requests for bus ownership and receives requests for bus ownership from other symmetric agents, each said symmetric arbitration means also for arranging said symmetric agents in a circular order of priority and selecting a symmetric owner from the symmetric agents requesting ownership of said bus means during an arbitration event, said symmetric owner performing a bus transaction on said bus means;

each of said symmetric arbitration means including rotating identifier means for indicating a lowest priority symmetric agent upon said arbitration event, ownership state means for indicating first and second ownership states, and priority agent request detecting means for detecting bus ownership requests from said at least one priority agent, wherein said symmetric arbitration means of said symmetric owner releases ownership of said bus means when a priority agent request is detected, unless said bus transaction is a locked transaction.

2. The computer system of claim 1 wherein said first state indicates none of said symmetric agents is a symmetric owner and said second state indicates said symmetric owner is selected.

3. The computer system of claim 2, wherein each symmetric arbitration means further comprises:

an agent identifier means for uniquely identifying each of said symmetric agents.

4. The computer system of claim 3, wherein each symmetric arbitration means further comprises:

symmetric agent request detecting means for detecting bus ownership requests from said other symmetric agents, wherein when one symmetric agent is said symmetric owner its symmetric arbitration means releases ownership of said bus means when its symmetric agent request detecting means detects a request unless said bus transaction is atomic.

5. The computer system of claim 4 wherein when said one symmetric agent is said symmetric owner its symmetric arbitration means releases ownership of said bus means when its symmetric agent request detecting means detects a request unless said bus transaction is a burst access.

6. A method of arbitrating for ownership of a bus among a plurality of stand-alone agents which include one or more symmetric agent(s) and at least one priority agent in a computer system, said symmetric agent(s) having a predetermined circular ordering, the method comprising the steps of:

issuing an arbitration event by said symmetric agent(s);

responsive to said arbitration event, determining in each symmetric agent, a symmetric owner from among said symmetric agent(s), each of said symmetric agent(s) performing the steps of:

reading a rotating ID value stored in each of said symmetric agents to determine a lowest priority symmetric agent in said circular ordering;

detecting which of said symmetric agents are requesting ownership of said bus;

from among said symmetric agent(s) requesting ownership of said bus, selecting a highest priority symmetric agent to be said symmetric owner;

updating said rotating ID value to indicate said symmetric owner; and granting ownership of said bus to said symmetric owner.

7. The method of claim 6 further comprising the step of:

in each said symmetric agent(s), reading a symmetric ownership state indicator stored therein to determine whether said symmetric bus ownership state is idle or busy, wherein said symmetric bus ownership state is idle if no symmetric owner is assigned to said bus, and wherein said symmetric bus ownership state is busy if said symmetric owner is assigned.

8. The method of claim 7 further comprising the step of:

parking on the bus by said symmetric owner if said symmetric bus ownership state is idle and said symmetric owner has not deasserted its request.

9. The method of claim 8 further comprising the initial step of:

in each symmetric agent, initializing said symmetric bus ownership state to idle and said rotating ID value to point to a predetermined one of said symmetric agent(s).

10. The method of claim 6 further comprising the additional step of:

relinquishing ownership of said bus by said symmetric owner to said priority agent in response to assertion of a priority request signal from said priority agent.

11. The method of claim 10 further comprising the step, prior to said relinquishing step, of:

performing a bus transaction by said symmetric owner.

12. In a computer system having a plurality of stand-alone agents which include a symmetric processor and a priority agent, said symmetric processor including an arbitration unit controlling access to a bus, a method for transferring ownership of said bus from said symmetric processor to said priority agent comprising the steps of:

asserting a priority request signal to request ownership of the bus by said priority agent;

determining that a lock signal has not been asserted by said arbitration unit of said symmetric processor;

granting ownership of said bus to said priority agent within a determined number of clocks after said priority agent asserts said priority request signal.

13. A multiprocessor (MP) computer system comprising:

a main memory;

a plurality of processors;

a first bus coupled to the plurality of processors and to the main memory providing information transfer therebetween;

a priority agent coupled to the first bus, the priority agent including an arbiter unit that arbitrates for ownership of the first bus;

wherein each processor includes a symmetric arbitration unit controlling processor access to the first bus, each processor asserting an address strobe signal when performing a transaction on the first bus, and asserting a lock signal to block other processors or the priority agent from acquiring the first bus;

the arbiter unit asserting a priority signal to request ownership from a processor having current ownership of the first bus, the processor relinquishing ownership within a determined number of clock cycles after the assertion of the priority signal unless the lock signal has been asserted by the processor, the arbiter unit releasing ownership of the first bus to the processors by deasserting the priority signal.

14. The MP computer system of claim 13 wherein the determined number of clock cycles is equal to four.

15. The MP computer system of claim 13 further comprising:

a second bus;

a plurality of input/output (I/O) devices coupled to the second bus; and wherein the priority agent comprises a bridge circuit providing an interface between the first and second buses, the bridge circuit including the arbiter unit which arbitrates for ownership of the first bus on behalf of the I/O devices.

16. The MP computer system of claim 15 wherein the determined number of clock cycles equals four.

17. The MP computer system of claim 15 wherein the symmetric arbitration unit of each processor includes:

a unique age identification (ID);

a rotating identification (ID) which reflects an agent ID of a lowest priority processor; and a bus ownership state bit which indicates whether the first bus is busy or idle.

18. The MP computer system of claim 17 wherein the lowest priority processor is equal to the agent ID of the processor having current ownership if the first bus is busy.

19. The MP computer system of claim 17 wherein the lowest priority processor is equal to the agent ID of a previous owner if the first bus is idle.

20. The MP computer system of claim 17 wherein the agent ID and the rotating ID each comprise two bits.

21. The MP computer system of claim 20 wherein the rotating ID of the processors changes in accordance with a round-robin arbitration scheme.

22. In a multiprocessor (MP) computer system comprising a plurality of symmetric processors each including an arbitration unit for controlling access to a bus, and a priority agent coupled to the bus, a method of arbitrating for ownership of the bus from a symmetric processor having current ownership of the bus, the method comprising the steps of:

(a) asserting by the priority agent a priority request signal during a first clock cycle;

(b) determining that a lock signal has not been asserted by the arbitration unit of the symmetric processor;

(c) determining within a certain time period of the first clock cycle whether a transaction is occurring on the bus; if so (d) waiting until the transaction completes; else, (e) waiting a predetermined number of clock cycles;

(f) obtaining ownership of the bus by the priority agent.

23. The method of claim 22 further comprising the step of:

deasserting the priority request signal to relinquish ownership of the bus by the priority agent.

24. The method of claim 22 further comprising the steps of:

asserting a bus request signal by another symmetric processor;

waiting until a rotating identification points to the another symmetric processor in accordance with a round-robin arbitration scheme;

performing a new bus transaction by the another symmetric processor.

25. The method of claim 24 further comprising the initial step of:

asserting a lock signal to prevent other symmetric processors from gaining ownership of the bus.

26. The method of claim 24 wherein the bus request signal remains asserted until the new bus transaction completes when the new bus transaction is a burst access.

27. The method claim 24 further comprising the step of:

parking on the bus by the symmetric processor to perform an additional bus transaction.

28. A computer system comprising:

a main memory;

a plurality of stand-alone agents which includes symmetric agents and a priority agent, at least one of the symmetric agents being a processor;

a first bus coupled to the symmetric agents and to the main memory providing information transfer therebetween;

a priority agent coupled to the first bus, the priority agent including an arbiter unit that arbitrates for ownership of the first bus;

wherein each of the symmetric agents includes an arbitration unit controlling agent access to the first bus, a symmetric agent asserting an address strobe signal when performing a transaction on the first bus, and asserting a lock signal to block other symmetric agents or the priority agent from acquiring the first bus;

the arbiter unit asserting a priority signal to request ownership of the first bus from a symmetric agent having current ownership of the first bus, the symmetric agent relinquishing ownership within a determined number of clock cycles after the assertion of the priority signal unless the lock signal has been asserted by the symmetric agent, the arbiter unit releasing ownership of the first bus back to the symmetric agents by deasserting the priority signal.

29. The computer system of claim 28 wherein the determined number of clock cycles is equal to four.

30. The computer system of claim 28 further comprising:

a second bus;

a plurality of input/output (I/O) devices coupled to the second bus; and wherein the priority agent comprises a bridge circuit providing an interface between the first and second buses, the bridge circuit including the arbiter unit which arbitrates for ownership of the first bus on behalf of the I/O devices.

31. The computer system of claim 30 wherein the determined number of clock cycles equals four.

32. The computer system of claim 28 wherein the arbitration unit of each of the symmetric agents includes:

a unique age identification (ID);

a rotating identification (ID) which reflects an agent ID of a lowest priority symmetric agent; and a bus ownership state bit which indicates whether the first bus is busy or idle.

33. The computer system of claim 32 wherein the lowest priority symmetric agent is equal to the agent ID of the symmetric agent having current ownership if the first bus is busy.

34. The computer system of claim 32 wherein the lowest priority processor is equal to the agent ID of a previous owner if the first bus is idle.

35. The computer system of claim 32 wherein the agent ID and the rotating ID each comprise two bits.

36. The computer system of claim 35 wherein the rotating ID of the symmetric agents changes in accordance with a round-robin arbitration scheme.

37. In a computer system comprising a plurality of stand-alone agents coupled to a bus, the stand-alone agents including symmetric agents and a priority agent, each of the symmetric agents including an arbitration unit for controlling access to the bus, wherein at least one of the symmetric agents is a processor, a method for arbitrating ownership of the bus from a symmetric agent having current ownership of the bus comprising the steps of:

(a) asserting by the priority agent a priority request signal during a first clock cycle;

(b) determining that the arbitration unit of the symmetric agent has not asserted a lock signal;

(c) determining within a certain time period of the first clock cycle whether a transaction is occurring on the bus; if so (d) waiting until the transaction completes; else, (e) waiting a predetermined number of clock cycles;

(f) obtaining ownership of the bus by the priority agent.

38. The method of claim 37 further comprising the step of:

deasserting the priority request signal to relinquish ownership of the bus by the priority agent.

39. The method of claim 37 further comprising the steps of:

asserting a bus request signal by another symmetric agent;

waiting until a rotating identification points to the another symmetric agent in accordance with a round-robin arbitration scheme;

performing a new bus transaction by the another symmetric agent.

40. The method of claim 39 further comprising the initial step of:

asserting a lock signal to prevent other symmetric agents from gaining ownership of the bus.

41. The method of claim 39 wherein the bus request signal remains asserted until the new bus transaction completes when the new bus transaction is a burst access.

42. The method claim 39 further comprising the step of: parking on the bus by the another symmetric agent to perform an additional bus transaction.

43. A computer system with distributed bus arbitration comprising:

a bus;

a plurality of stand-alone agents coupled to said bus, said stand-alone agents including symmetric agents and a priority agent;

each of said symmetric agents having logic circuitry that sends a symmetric request signal on said bus to request ownership of said bus and which receives symmetric request signals from other symmetric agents and which also receives a priority request signal from said priority agent, said symmetric owner of said bus being determined by said logic circuitry as among said symmetric agents according to an algorithm;

wherein said logic circuitry of said symmetric owner releases ownership of said bus when said priority request signal is received.

44. The computer system of claim 43 wherein said logic circuitry of said symmetric owner asserts a lock signal during an atomic bus transaction.

45. The computer system of claim 44 wherein said logic circuitry of said symmetric owner releases ownership of said bus when said priority request signal only after said atomic transaction has completed.

46. The computer system of claim 43 wherein said algorithm comprises a round-robin algorithm that arranges said symmetric agents in a circular priority order.

47. The computer system of claim 43 wherein at least one of said symmetric agents comprises a microprocessor.

48. The computer system of claim 47 wherein said priority agent comprises a bus arbiter that arbitrates for ownership of said bus on behalf of a plurality of input/output (I/O) devices.

* * * * *

UNITED STATES PATENT AND TRADEMARK OFFICE
CERTIFICATE OF CORRECTION

| | | |
|---|---|---|
| PATENT NO. | : | 5,581,782 |
| DATED | : | December 3, 1996 |
| INVENTOR(S) | : | Sarangdhar et al. |

It is certified that error appears in the above-identified patent and that said Letters Patent is hereby corrected as shown below:

In column 9 at line 16 delete "Rotating D 510" and insert --Rotating ID 510--

In column 10 at line 12 delete "Rotating D" and insert --Rotating ID--

In column 16 at line 43 delete "agent I" and insert --agent 1--

Signed and Sealed this

Sixth Day of May, 1997

Attest:

Attesting Officer

BRUCE LEHMAN

Commissioner of Patents and Trademarks